United States Patent [19]
Bantz et al.

[11] Patent Number: 5,394,433
[45] Date of Patent: Feb. 28, 1995

[54] FREQUENCY HOPPING PATTERN ASSIGNMENT AND CONTROL IN MULTIPLE AUTONOMOUS COLLOCATED RADIO NETWORKS

[75] Inventors: David F. Bantz, Chappaqua, N.Y.; Frederick J. Bauchot, LaTourraque Saint-Jeannet, France; Chia-Chi Huang, Hsinchu, Taiwan; Fabien P. Lanne, Saint Laurent duvar, France; Kadathur S. Natarajan, Millwood, N.Y.; Michelle M. Wetterwald, Cagnes Sur Mer, France.

[73] Assignee: International Business Machines Corporation, Armonk, N.Y.

[21] Appl. No.: 52,329

[22] Filed: Apr. 22, 1993

[51] Int. Cl.$^6$ .............................. H04L 1/04
[52] U.S. Cl. .................................... 375/202
[58] Field of Search .............................. 375/1

[56] References Cited

U.S. PATENT DOCUMENTS

| | | | |
|---|---|---|---|
| 4,532,636 | 7/1985 | Wilkinsen | 375/1 |
| 4,554,668 | 11/1985 | Deman et al. | 375/1 |
| 4,850,036 | 7/1989 | Smith | 455/179 |
| 4,872,205 | 10/1989 | Smith | 455/58 |
| 4,998,290 | 3/1991 | Olenick et al. | 455/53 |
| 5,038,399 | 8/1991 | Bruckert | 455/33 |
| 5,079,768 | 1/1992 | Flammer | 370/94.1 |
| 5,117,422 | 5/1992 | Hauptschein et al. | 375/1 |
| 5,121,408 | 6/1992 | Cai et al. | 375/1 |
| 5,123,029 | 6/1992 | Bantz et al. | 375/1 |
| 5,146,471 | 9/1992 | Cowart | 375/1 |
| 5,235,613 | 8/1993 | Brown et al. | 375/1 |
| 5,237,398 | 10/1993 | Schaeffer | 375/1 |
| 5,287,384 | 2/1994 | Avery et al. | 375/1 |

FOREIGN PATENT DOCUMENTS

| | | | |
|---|---|---|---|
| 3415032A1 | 4/1984 | Germany | H04B 7/24 |
| 2203314A | 4/1987 | United Kingdom | H04K 1/04 |

Primary Examiner—Salvatore Cangialosi
Attorney, Agent, or Firm—Jack M. Arnold; Ronald L. Drumheller

[57] ABSTRACT

A control system for automated management of frequency-hopping in a radio network. The system includes a Wireless Network Manager (WNM) or Controller and a Wireless Control Agent (WCA), which control the distribution and maintenance of hopping patterns in the radio network. In a single cell network, the WNM and the WCA are included in a single base station. In a multiple cell network, the WNM is in a specific station on a LAN, and a WCA is located in each base station on the LAN. In each instance, the WNM is a centralized managing station and the WCA acts as a cell controller.

22 Claims, 12 Drawing Sheets

BOTH LOGICAL LANS INSTALLED IN RADIO PROXIMITY

X - BASE STATION

FREQUENCY HOPPING PATTERN ASSIGNMENT AND CONTROL IN MULTIPLE AUTONOMOUS COLLOCATED RADIO NETWORKS

FIELD OF THE INVENTION

This invention relates generally to data communications, and in particular such communications in a Local Area Network (LAN). Specifically, the invention is directed to frequency hopping pattern assignment, interference monitoring, and hopping pattern revision in a multiple autonomous collocated radio network environment.

BACKGROUND OF THE INVENTION

A multicell radio LAN installation based on Slow Frequency Hopping Spread Spectrum signalling may consist of a set of base stations with overlapping coverage areas. In a Frequency-Hopping (FH) system, the carrier frequency of the transmitter changes at intervals of time, remaining constant between those instants. The period of constant frequency is called a "hop" and it is during these hops that messages may be exchanged. In a Slow Frequency Hopping system, the duration of a hop is at least an order of magnitude longer than typical message transmission time. A multicell radio LAN may also be referred to as a Logical LAN. Key to the successful operation of Logical LANs are effective methods for the control of interference.

There are a number of patents in this general technological area, each having certain advantages and disadvantages.

U.K. patent application GB 2,203,314A to Heading discloses a frequency hopping assignment arrangement having a processor in which is stored terrain data, radio performance data and hopper performance data. The processor is provided with a keyboard whereby geographical input information, information relating to the nets and the assignment requirements are entered. The processor is arranged to execute an algorithm in which the stored data and the information input by the input means causes the frequency hopping arrangement to assign the hopping frequencies.

U.S. Pat. No. 4,872,205 to Smith discloses a frequency-hopping communication system that when initially enabled, it detects another system operating within range by listening for a predefined radio frequency of a fixed duration. When that particular frequency is detected, the system knows that a master system is operating within range and is utilizing a first predetermined group of communication frequencies and, consequently, selects a second, third, etc. predetermined group of communication frequencies. If the particular radio frequency is not detected, the system becomes the master system, selects the first predetermined group of communication frequencies for intrasystem communication and begins transmitting the predefined radio frequency to indicate its master status.

U.S. Pat. No. 4,850,036 to Smith discloses a frequency-hopping radio communication system comprising a control unit which transmits to and receives from each of a plurality of slave stations using a frequency-hopping mode of operation. During a start-up mode, the control unit communicates a starting message to each slave station using a predefined frequency. The message identifies to each slave station a frequency-hopping sequence to be used to select the frequencies from a group of frequencies for transmission to and reception from the control unit. This message also specifies to each slave station unique starting frequencies in the frequency-hopping sequence at which to begin transmitting and receiving. All slave station transmissions are synchronized to the control unit transmissions, thereby preventing any two stations from concurrently using the same frequencies for either transmitting to or receiving from the control unit.

U.S. Pat. No. 4,998,290 to Olenick et al discloses a system for effecting radio communication over a given range of frequency channels among a plurality of participating local stations and which includes: a variably settable channel transmission unit at each such participating local station; and a controller or central station having an interference array processor for receiving data characterizing the system and each such participating local station for assigning datum channels (frequencies) to each such participating station with prescribed channel spacing and what is termed a "book-page generator" for compiling data in successive book pages of initial and subsequent channel assignments for stations with maintenance of such datum channel spacing. Further data compilations are made from the book-page generator in what are termed "station pages", comprising frequency shift instructions specific to the stations. Since a station page is derived from plural book pages, any station may be compromised without revelation of the contents of the book pages.

U.S. Pat. No. 4,554,668 to Deman et al discloses a radio communications system comprising at least one master station and a plurality of slave stations in two-way frequency-hopping communication therewith. For telephony, speech is digitally encoded. Digital data is transmitted in packets using successive bursts at different frequencies separated by intervals of silence. Each slave station has its own frequency-hopping pattern independent of the patterns of the other slave stations but sharing a common pool of available frequencies. The master stations are capable of generating any of the slave station patterns instantly. The master stations broadcast network time information for synchronization purpose, and the slave station patterns are determined by a combination of a slave station identification number and network time.

U.S. Pat. No. 4,532,636 to Wilkinson discloses radio communications receivers for use on frequency hopping communications networks in which the received signal in each hop period is analyzed and assigned a quality value. If more than one signal is present during the hop period, it is determined that more than one network has changed to the same frequency. Similarly, if the received signal is out of synchronism, it is determined that more than one network has changed to the same frequency. When more than one network has changed to the same frequency, the received signal is not output by the receiver but is replaced by an earlier (or later) received signal.

U.S. Pat. No. 5,038,399 to Bruckert discloses a radio frequency communication system employing channelization, such as a cellular TDMA system, and having a plurality of reuse channel levels, such as multiple frequency reuse patterns, each level having at least one associated reuse channel, a method and device comprising: determining relative interference for a reuse channel of a first reuse level in relation to relative interference for a reuse channel of at least a second reuse level resulting in a reuse level gradient and assigning the subscriber unit to at least one reuse level in response to the reuse level gradient.

U.S. Pat. No. 5,079,768 to Flammer discloses a frequency-hopping packet communication system without a master clock or master control unit which bases use of a receiver's frequency hopping timing and identification to control communication. A frequency-hopping band plan, involving the number of channels and the pseudo-random pattern of frequency change and nominal timing of changes, is universally known to each node in the network. Frequency-hopping is implemented by the division of communication slots and the accumulation of slots into epochs, wherein each epoch equals the total number of available slots (number of channels times the number of time frames per channel). A transmitting node tracks the preestablished frequency-hopping pattern for its target receiver based on previously-acquired information. The transmission node identifies a receiver node and a current frequency channel of such receiver node. The transmission node then checks the frequency channel to determine if available (e.g., not in use and within an acceptable noise margin). If unavailable, the transmission node delays transmission to the identified node to a later slot. During the delay, the transmission node identifies another receiver node and a corresponding current frequency channel. The steps of identifying a receiver node and checking the corresponding current frequency channel are repeated until a node having an available frequency channel is identified. The transmission node then sends a packet to the selected receiver node at a frequency and for a duration defined according to the current slot. Such transmission node tracks the changing frequency of the selected receiver node to maintain frequency synchronization.

U.S. Pat. No. 5,123,029 to Bantz et al, which is assigned to the assignee of this invention discloses a hybrid of controlled access and random access schemes using frequency hopping spread spectrum communication techniques, and which is implemented in an indoor digital data radio communication system between mobile stations and a computer system. A hop in the frequency hopping spread spectrum communication system is subdivided into two intervals so that different media-access protocols can be used in each interval. The protocol uses a centralized control scheme in one interval and a decentralized scheme in the other, and the intervals may be varied depending on the load of the system. U.S. Pat. No. 5,123,029 is incorporated herein by reference.

According to the present invention, control algorithms are derived for automated management of Frequency-Hopping operations in multiple cell radio networks. Specific problems solved include: 1) The assignment of frequency hopping patterns to multiple cells within an autonomous multicell network. 2) Assignment methods by which multiple autonomous, collocated networks can choose Frequency Hopping patterns and adapt their behavior such that the probability of intercell interference is minimized. These methods enable independent network operation without the need for any explicit coordination between networks. 3) Revision of Frequency Hopping patterns to minimize the impact of interference.

DISCLOSURE OF THE INVENTION

A control system for automated management of frequency-hopping in a radio network. The system includes a Wireless Network Manager (WNM) or Controller and a Wireless Control Agent (WCA), which control the distribution and maintenance of hopping patterns in the radio network. In a single cell network, the WNM and the WCA are included in a single base station. In a multiple cell network, the WNM is in a specific station on a LAN, and a WCA is located in each base station on the LAN. In each instance, the WNM is a centralized managing station and the WCA acts as a cell controller.

DESCRIPTION OF THE PREFERRED EMBODIMENT

Figure 1:
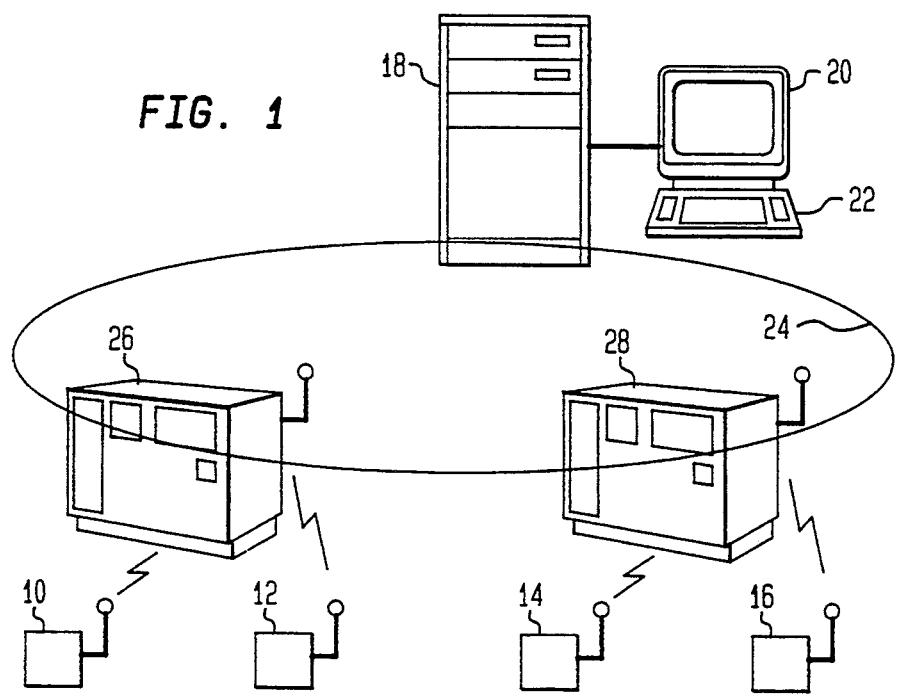
FIG. 1 is a pictorial diagram showing an indoor radio digital data communication system of the type in which the invention is implemented.

Referring now to the drawings, and more particularly to FIG. 1, there is shown an indoor radio system allowing communication between a plurality of mobile stations 10, 12, 14, and 16 and applications and data residing in a computing system. It is to be appreciated that other systems may be utilized in the practice of the invention. The computing system typically includes a Wireless Network Manager (WNM) or Wireless Network Controller 18, with attached monitor 20 and keyboard 22, of a local area network (LAN), generally indicated by reference numeral 24, having a plurality of attached workstations or personal computers (not shown for simplicity). Also attached to the LAN are one or more gateways 26 and 28 with which the mobile stations 10, 12, 14, and 16 communicate. These gateways, referred to as base stations, are augmented according to the invention to provide certain radio system management functions which coordinate the mobile stations' access to the common radio channel. Communications between mobile stations is supported via relay through the base stations 26 and 28.

Figure 1A:
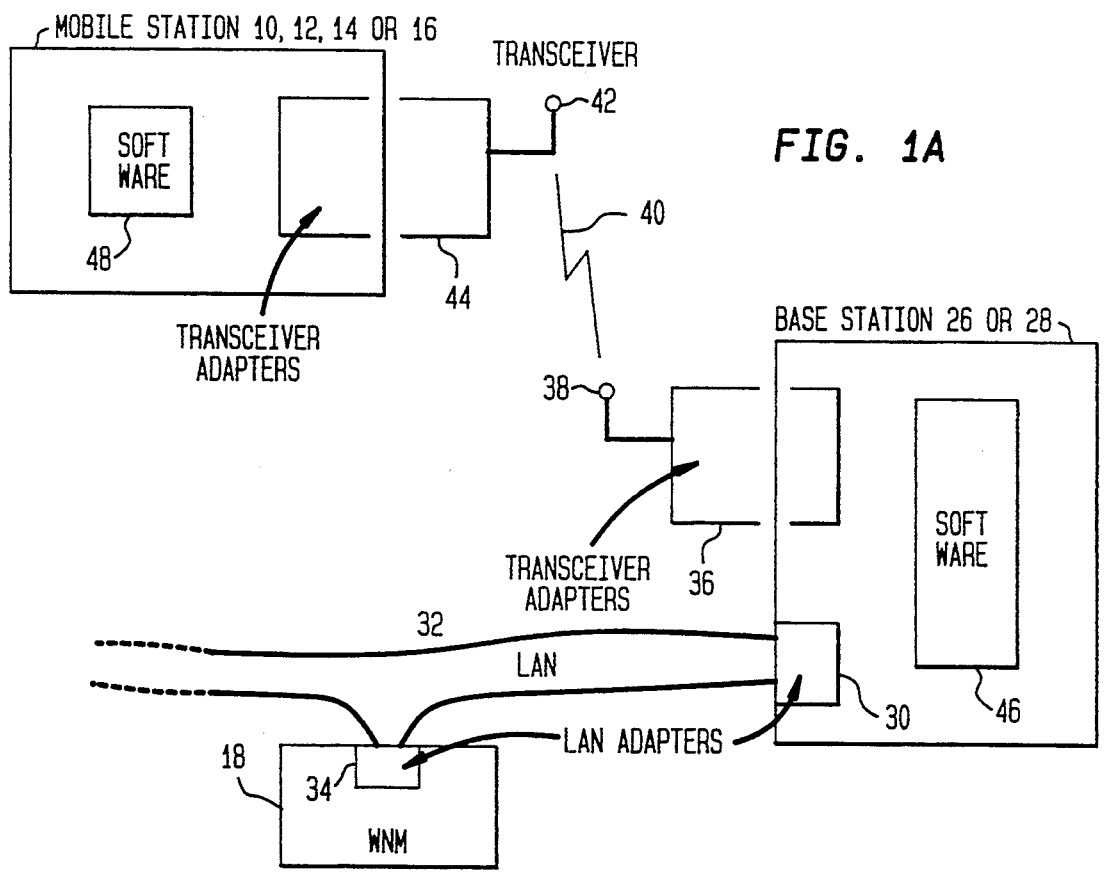
FIG. 1A is a block diagram of the system shown in FIG. 1 illustrating the basic components of a mobile station and a base station.

As shown in more detail in FIG. 1A, a base station 26 or 28, which may be a conventional microcomputer, has a LAN adapter 30 inserted in a bus slot and connected to LAN cabling 32. The WNM 18, typically also a conventional microcomputer and including one or more direct access storage devices (DASDs) such as hard disks (not shown), also has a LAN adapter 34 inserted in a bus slot and connected to LAN cabling 32. The LAN adapters 30 and 34 and the LAN cabling 32 together with LAN software constitute the LAN 24. The LAN 24 is of conventional design and does not form part of the invention. The base station 26 or 28 also has an RF transceiver adapter 36 implemented as a printed circuit card which is inserted in a bus slot of the base station. The transceiver adapter 36 includes a spread spectrum transceiver of conventional design. The transceiver adapter 36 has an antenna 38 by which a radio link 40 is established with one or more remote or mobile stations, 10, 12, 14, or 16. The mobile station may itself be a hand held or lap top computer of conventional design and, like the base station, it is provided with an antenna 42 and a transceiver adapter 44, also implemented as a printed circuit card which is inserted in a bus slot of the computer. The transceiver adapter 44, like transceiver adapter 36, includes a spread spectrum transceiver of similar design. The base station and the mobile stations are further provided with software, generally indicated by reference numerals 46 and 48, respectively, which support their respective transceiver adapters.

Figure 2:
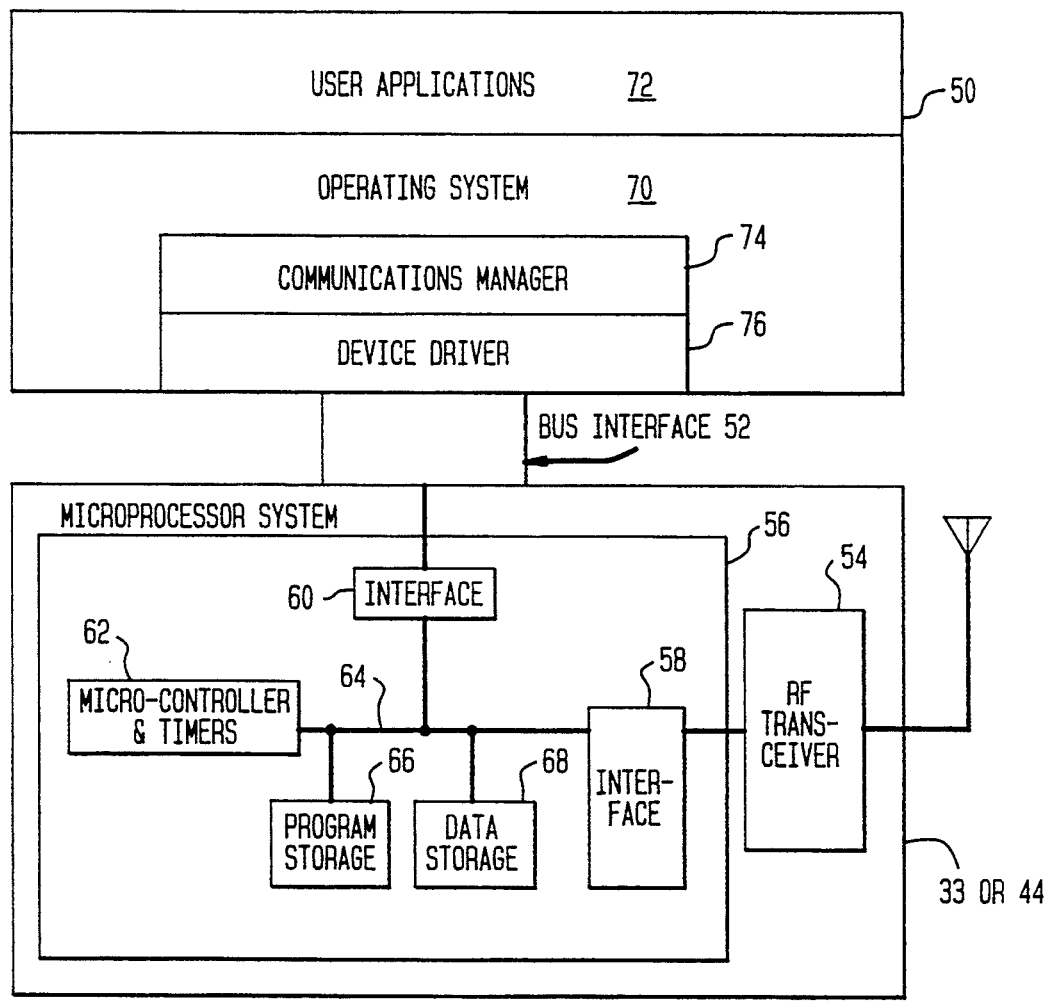
FIG. 2 is a block diagram of the radio system used in the implementation of a preferred embodiment of the invention.

FIG. 2 shows the radio system common to both the mobile stations and the base stations of FIG. 1. The radio system includes a transceiver adapter 36 or 44 connected to the computer 50 via the computer's bus interface 52. The transceiver section is itself divided into an RF transceiver 54, which may be a commercially available spread spectrum transceiver, and a dedicated microprocessor system 56 which controls the transceiver via an interface 58. The microprocessor system 56 further includes a system interface 60 which interfaces the transceiver section to the computer section 50. The microprocessor system includes a dedicated microprocessor 62 containing high-resolution time interval determination hardware or "timers" typical of real-time microprocessor systems.

Microprocessor 62 is connected by a memory bus 64 to program storage 66 and data storage 68 as well as to interfaces 58 and 60 providing attachment to bus interface 52 and RF transceiver 54, respectively. Program storage 66 is typically read only memory (ROM), while data storage 68 is static or dynamic random access memory (SRAM or DRAM). Packets received or to be sent are held in data storage 68 and communicated to or from the RF transceiver 54 via interface 58 under control of serial channels and a direct memory access (DMA) controller (not shown) which is part of the microprocessor 62. The function of these serial channels is to encapsulate data and control information in an HDLC (high-level data link control) packet structure and provide the packet in serial form to the RF transceiver 54. For more information on the HDLC packet structure, see, for example, Mischa Schwartz, *Telecommunication Networks: Protocols, Modeling and Analysis*, Addison-Wesley (1988).

When a packet is received through the RF transceiver 54, the serial channels check the packet destination address, check for errors, and deserialize the packet to data storage 68. The serial channels must have the capability to recognize a specific adaptor address as well as a broadcast address. Specific microprocessors with appropriate serial channel and timer facilities include the Motorola 68302 and the National HPC46400E microprocessors.

The computer 50 runs an operating system 70 which supports one or more user application programs 72. The operating system 70 may include a communications manager 74, or the communications manager 74 may itself be an application program installed on the computer. In either case, the communications manager 74 controls a device driver 76 via the operating system 70. The device driver 76, in turn, communicates with the transceiver adapter 36 or 44 via bus interface 52.

Figure 3:
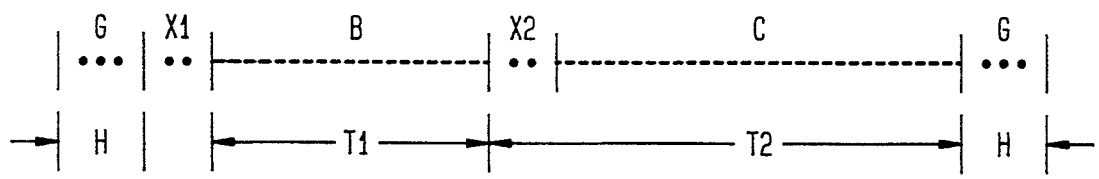
FIG. 3 is a data framing diagram showing one medium access control protocol which may be implemented by the invention.

FIG. 3 shows one protocol which may be implemented by the invention. It is to be appreciated that other protocols may be utilized in the practice of the invention. While the protocol is equally applicable to radio frequency (RF), infrared (IR), or wired transmission systems with broadcast capability, and to either conventional or spread-spectrum modulation techniques, slow-frequency-hopped spread spectrum radio systems have a natural affinity for the protocol since those systems share a structure to time with the protocol. However, the invention has been implemented using direct sequence spread spectrum systems which may be readily adapted to the protocol.

With reference to FIG. 3, there are five intervals defining a "hop". The first (and last) interval, G, is the interval during which the transmitter carrier frequency is changing. Note that the G interval is needed only for frequency hopping systems. This interval has a duration H. The next interval, $X_1$, is the interval during which the base station broadcasts a special message to all the mobile stations identifying the beginning of the following, or B, interval. The B interval is the interval during which, by convention, only the base station may initiate transmission and mobile stations may respond only when required by the message protocol. For example, the mobile station may acknowledge a message outbound from the base or may respond when polled. The B interval has a duration $T_1$. The B interval is followed, in turn, by the $X_2$ interval which is the interval during which the base station broadcasts a special message to all the mobile stations identifying the end of the B interval and, by implication, the beginning of the C interval. The message also conveys the length of the C interval and, optionally, the length of the B interval as well.

The $X_2$ broadcast message is not strictly necessary. Information about the entire hop structure can be conveyed in the $X_1$ interval. The $X_2$ message is included to support operation of simplified remote stations capable of only contention-mode operation. These stations wait for the $X_2$ message and contend subsequently.

The C interval is the interval during which any station, including (or optionally excluding) the base station, may contend for the channel and transmit a message without the consent of the base station. For example, a CSMA/CA (carrier sense multiple access with collision avoidance) protocol may be used in this interval. The C interval is approximately of duration $T_2$.

If a mobile station sends a message and receives an acknowledgement, it can assume the message has been received correctly. If not, it will contend again. There is a guard interval at the end of the C interval during which a mobile station with a particular message may not transmit. If $T_{msg}$ is the time to transmit a particular message and $T_{ack}$ is the time to transmit an acknowledgement and $T_{turnaround}$ is the time between the end of a transmission of a message and the initiation of the transmission of an acknowledgement, then the guard interval is $T_{msg}+T_{ack}+T_{turnaround}$. Note that because $T_{msg}$ is a function of the length of the message to be transmitted, the guard interval may be different for different mobile stations having a message to send. The guard interval is not wasted; rather, messages and acknowledgements are sent and received right up to the end of the C interval.

By varying the time $T_2$, the base station can expand or contract the contention interval. If the system is very lightly loaded and most of the traffic is inbound to the base station, it is advantageous to mobile response time to lengthen the time period $T_2$. Conversely, if the system is heavily loaded and most of the traffic is outbound, the time period $T_2$ should be minimized. The time period $T_2$ should not be reduced to zero, however, as it is the only mechanism by which a newly activated mobile station can register itself to the base station.

Figure 3A:
FIG. 3A is a data framing diagram showing a modification of the basic protocol illustrated in FIG. 3.

Additionally, a further subdivision of the B interval, in which remote-to-base traffic is carried in allocated time slots, may be made as shown in FIG. 3A. In FIG. 3A, the B interval is subdivided into $B_1$ and $B_2$ subintervals, and the $B_2$ subinterval is, in turn, subdivided into a plurality of time slots, each time slot being allocated to a specific remote station. Requests for an allocated slot may be made by a remote station in response to a poll during the $B_1$ subinterval, or the requests may be made during the C interval. Once confirmed by a message from the base station, slot allocation guarantees that the remote station can transmit to the base station during its allocated time slot.

By varying the boundary between the $B_2$ subinterval and the C interval, the suitability of the system to different types of traffic can be adjusted. As the traffic load for steady, predictable traffic (e.g., real-time audio and video) increases, the boundary can be moved to lengthen the $B_2$ subinterval and shorten the C interval, thereby increasing the number of allocatable time slots. Conversely, as the traffic becomes less predictable, the boundary can be moved to lengthen the C interval, providing greater bandwidth for contention-based traffic.

From FIG. 3, it will be appreciated that the "hop" is divided into to two subdivisions, one of which supports a controlled access scheme and the other of which supports a random access scheme. The invention may operate in any one of three modes: one in which only the $X_1$ message is sent, one in which only the $X_2$ message is sent, and one in which both are sent.

In the case where only the $X_1$ message is sent, the $X_1$ message constitutes the header section of a frame. It identifies the start of the information frame, carries a unique identification of the base station, identifies the frequency hopping pattern, and defines the length of the B and C intervals. Optionally the $X_1$ message also carries general broadcasting and system control information.

In operation, each mobile station waits for the $X_1$ message. When received, a mobile station sets an internal timer for $T_1$ and for $T_1+T_2$ so that it knows when the contention interval begins and when to schedule its next frequency change. Broadcast reception of messages is not guaranteed, only likely. Radio conditions may be such that a particular mobile station does not hear the broadcast message $X_1$. Because a mobile station cannot transmit autonomously without first hearing the $X_1$ message and letting $T_1$ elapse, it will remain quiet for the entire frame. Alternatively, if the mobile station is polled by the base station during interval B, it may respond, but in no case can it contend in the C interval. It must remember $T_1+T_2$ from the last frame so that it knows when to hop, and it will listen in the next frame for the $X_1$ message. If no $X_1$ message is heard for a number of consecutive frames, the mobile station must assume that it has lost hop synchronization with the rest of the system and enter a synchronization acquisition mode.

Each frame time period of length $T=T_1+T_2$ can also be a frequency hopping period for implementation under FCC regulation part 15. A fixed length of time T is recommended but not necessary. A fixed length of time T is especially useful in the following cases:

1) When several frequency hopping patterns are used in overlapped operation in a multicell radio system, a fixed length of time T makes interference separation much more feasible. In this case, the frequency hopping pattern information in the header section can be used to identify the hopping sequence for a mobile terminal to follow.
2) If all radios in a system are hopping with the same pattern, a fixed length of time T permits different cells to hop in synchronism but at different phases of the hopping pattern. This eliminates interference between cells.

A tradeoff needs to be made in selecting the length of time T. A large time T makes the system overhead smaller, and a small time T makes the system response time smaller.

Instead of the $X_1$ message, the system can transmit the $X_2$ message only. The content of the $X_2$ message can be similar to that of the $X_1$ message except that mobile stations receiving the $X_2$ message can immediately begin contention. This may be an advantage in some applications.

For the case of transmitting the $X_2$ message only, suppose the base station polls a mobile station near the end of the B interval, and the mobile station responds with a lengthy message. (Generally, the protocol must prohibit these responses from being too lengthy.) It may be that the response is active even as the period $T_1$ expires. With only $X_1$ messages, this may be a problem, but with $X_2$ messages, the base station can then originate the $X_2$ message as soon as the response is complete, making sure to include a shortened $T_2$ period in the $X_2$ message. The effect will be to diminish the contention interval for one hop's duration.

In the third mode of operation, both $X_1$ and $X_2$ messages can be used to simplify the implementation of the mobile station and to provide redundancy. The $X_1$ message would then signal the beginning of the B interval, and the $X_2$ message, the C interval.

In a specific implementation of the invention, the $X_1$ message only was used. An advantage of the $X_1$ message over the $X_2$ message is that the time of occurrence of the $X_1$ message is known to the mobile stations which, in order to save power, may power down their receivers until the time the $X_1$ message is expected. This also reduces susceptibility to spurious reception of X-type messages. The combination of $X_1$ and $X_2$ messages is the safest and simplest to implement at the mobile stations. $X_2$ messages only can provide some simplicity for contention-only mobiles.

The dynamic adjustment of the relative durations of the B and C intervals depending on the load of the system is an important aspect of the subject invention. Since all messages involve the base station, the base station can recorded the relative traffic intensity (number of messages) in each of the B and C intervals. The recording is typically done by keeping running tallies of the number of messages in each interval over a predetermined time period. At the end of the time period, the base station evaluates the tallies accumulated for each interval and, based on this information and other related factors, makes a decision as to whether the length of each interval is to be varied.

As a specific example, consider the modified protocol shown in FIG. 3A. If the number of messages from the base station to the mobile stations is large, the base station may choose to lengthen the $B_1$ subinterval and correspondingly shorten the $B_2$ subinterval and C interval. Conversely, if the C interval is heavily utilized and the mobile stations have little demand for allocated slots, the C interval can be lengthened at the expense of the $B_2$ subinterval.

Since the length of the B1 interval need only be sufficient to exhaust the base station's transmit queue for a particular frame, the base station may dynamically vary the length of this subinterval for each frame. The base station must estimate the length of the $B_1$ subinterval at the time the $X_1$ message is broadcast. This estimate is based on the number and length of the messages in the transmit queue at the start of the frame.

Other measures of traffic may also be taken into consideration by the base station, for example, a decision to lengthen the $B_2$ subinterval would most effectively be made on the basis of the number of outstanding slot allocation requests made by mobile stations. In addition, mobile stations may monitor the delay experienced in attempting to use the C interval (or the collisions they experience) and report this information to the base station either in response to periodic requests from the base station for status or as a field in the packet itself. Alternatively, the base station can determine the average transmit queue lengths for itself and all the active remotes. The queue lengths for the remote stations can be determined by periodic reporting or by including queue length's in all packets transmitted to the base station.

This invention describes methods and techniques for interference control in Logical LANS based on Slow Frequency Hopping Spread Spectrum communication. In a Slow Frequency Hopping system, the carrier frequency changes at a predetermined time. Specifically, disclosed are methods for accomplishing the following key steps in such a system.

1. FH Pattern Acquisition
2. FH Pattern Monitoring before Hopping
3. FH Pattern Revision Interference between adjacent cells in the system must be minimized, and preferably avoided altogether, by suitable FH pattern generation and assignment methods. Each Logical LAN has a centralized entity called a Wireless Network Manager (WNM) or Wireless Network Controller (WNC). The terms Wireless Network Manager and Wireless Network Controller will be used interchangeably throughout the following description. The FH component of the Wireless Network Manager performs FH pattern management and control functions in a Logical LAN. Each distinct Logical LAN is considered an Autonomous Network. Two autonomous networks are distinct and independent entities that do not explicitly coordinate with each other. Two Logical LAN's or networks are collocated if radio coverage of one or more of the cells of one LAN can interfere with one or more of the cells of the other LAN.

According to this invention, each system includes a WNM and a Wireless Control Agent (WCA). Where the WNM and WCA are physically situated, is a function of the type system.

Figure 4:
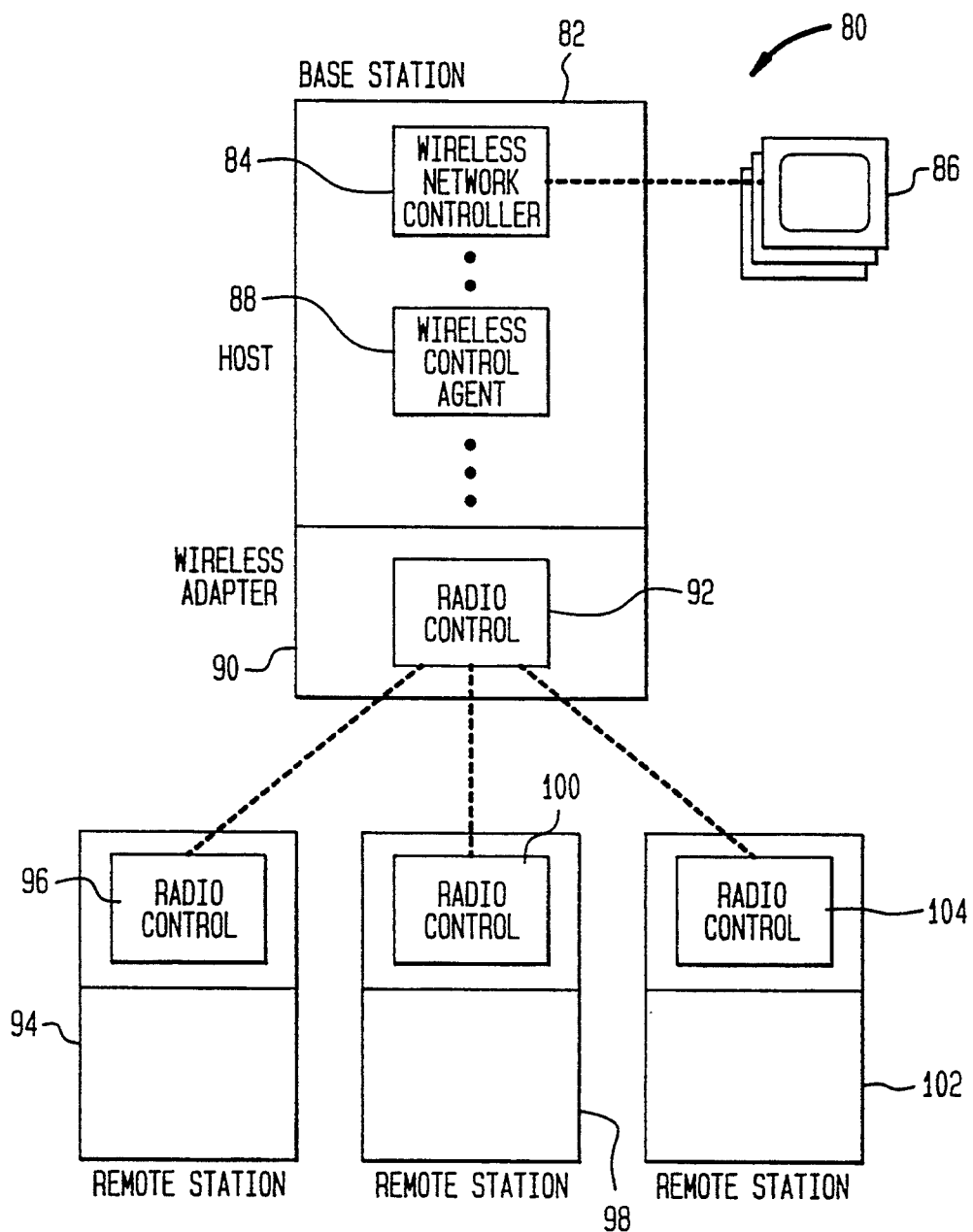
FIG. 4 is a block diagram of a single cell network.

In a single cell network 80, such as shown in FIG. 4, a base station 82 includes both a WNM 84 and a WCA 88. The WNM is connected to a monitor 86 and the WCA 88. The WNM 84 and WCA 88 are together responsible for the distribution and maintenance of hopping patterns. The WNM 84 is a centralized managing station operating in a specified station, in this instance, base station 82. The WCA 88 is located in every base station in a network. In this instance since there is only one base station 82, it is in the same station as the WNM 84. As discussed below, this is not the case in a multiple cell network.

The WCA 88 is connected to a wireless adapter 90, which includes a radio control transceiver 92 for communicating with a plurality of remote mobile stations. A remote station 94 includes a radio control transceiver 96 for communicating with radio control transceiver 92 in the wireless adapter 90 of base station 82. Remote stations 98 and 102 communicate in a like manner via radio control transceivers 100 and 104, respectively.

Figure 5:
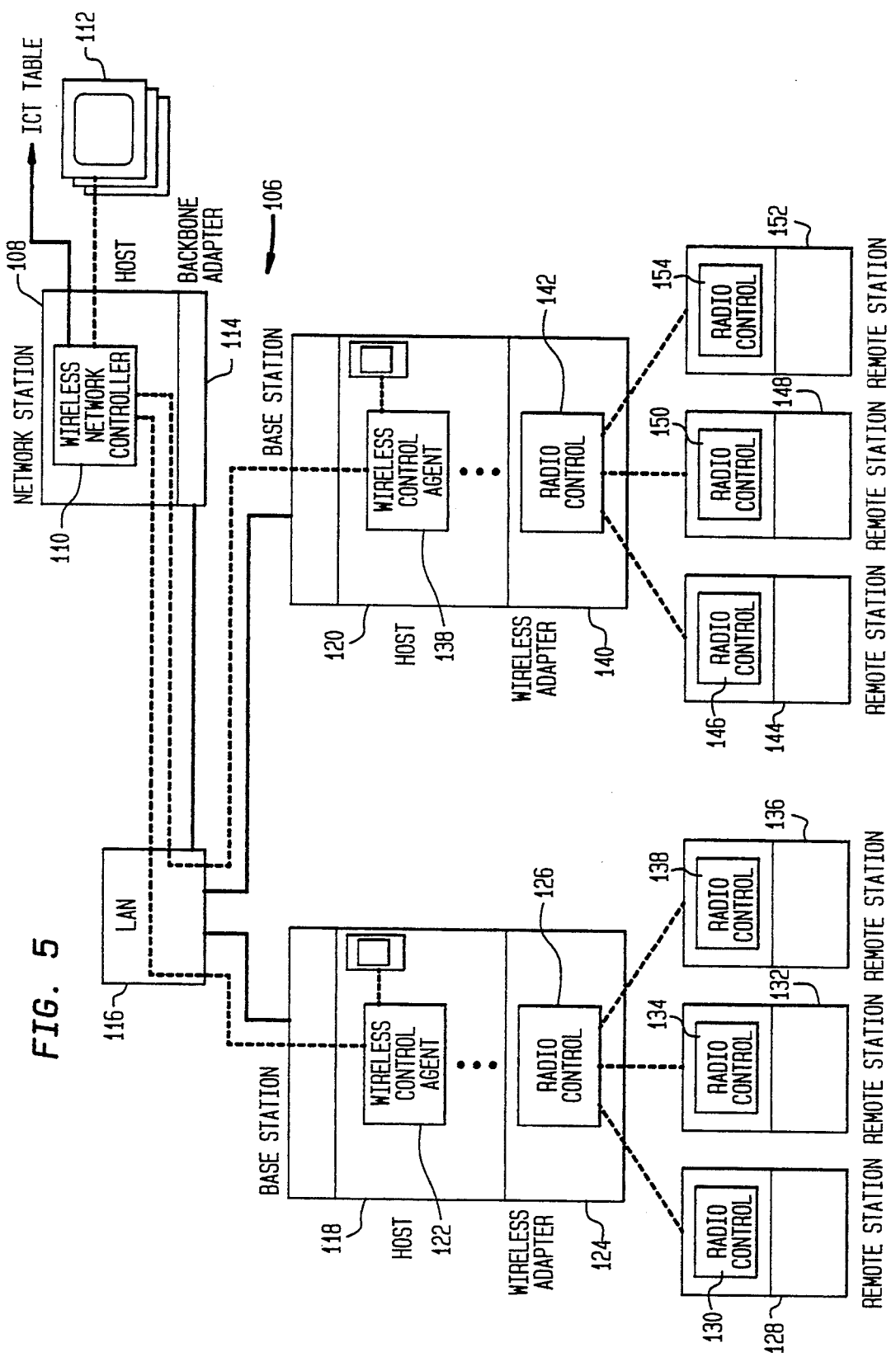
FIG. 5 is a block diagram of a multiple cell network.

FIG. 5 illustrates a multiple cell network 106 in which the WNM and WCA are in different physical units. In this instance, the WNM is a centralized managing section operating in a specific station. The WNM may be in any terminal or station on a backbone LAN, whether it is a base station or not. For multi-segment LANs, there is a unique WNM for the whole network. This is true even for heterogeneous LANS such as token-rings, Ethernets etc., as long as the network ID is unique.

The WCA is located in each base station linked to a backbone LAN, and acts as a representative of the WNM. The WCA functions as a cell controller and is responsible for opening the base station adapter for communication. As previously stated, the WNM and the WCA are responsible for the distribution and maintenance of the hopping patterns.

The multiple cell network 106 of FIG. 5 includes a base station termed a network station 108 which includes the WNM 110 which communicates with a monitor 112 and a backbone adapter 114 which is connected to a backbone LAN 116. It is seen that the network station 108 does not include a WCA.

A plurality of base stations, each of which includes a WCA, is connected to the LAN 116. For example, base stations 118 and 120 are connected to the LAN 116.

The base station 118 includes a WCA 122 which communicates with the WNM 110 of network station 108 via LAN 116, and with wireless adapter 124 which includes a radio control transceiver 126. The transceiver 126 communicates with a plurality of remote mobile stations 128, 132 and 136 which include radio control transceivers 130, 134 and 138, respectively.

The base station 120 includes a WCA 138 which communicates with the WNM 110 of network station 108 via LAN 116, and with wireless adapter 140 which includes a radio control transceiver 142. The transceiver 142 communicates with a plurality of remote mobile stations 144, 148 and 152 which include radio control transceivers 146, 150 and 154, respectively.

How FH pattern acquisition; monitoring before hopping; and pattern revision is accomplished for networks such as those set forth in FIGS. 4 and 5 is set forth below.

Figure 6:
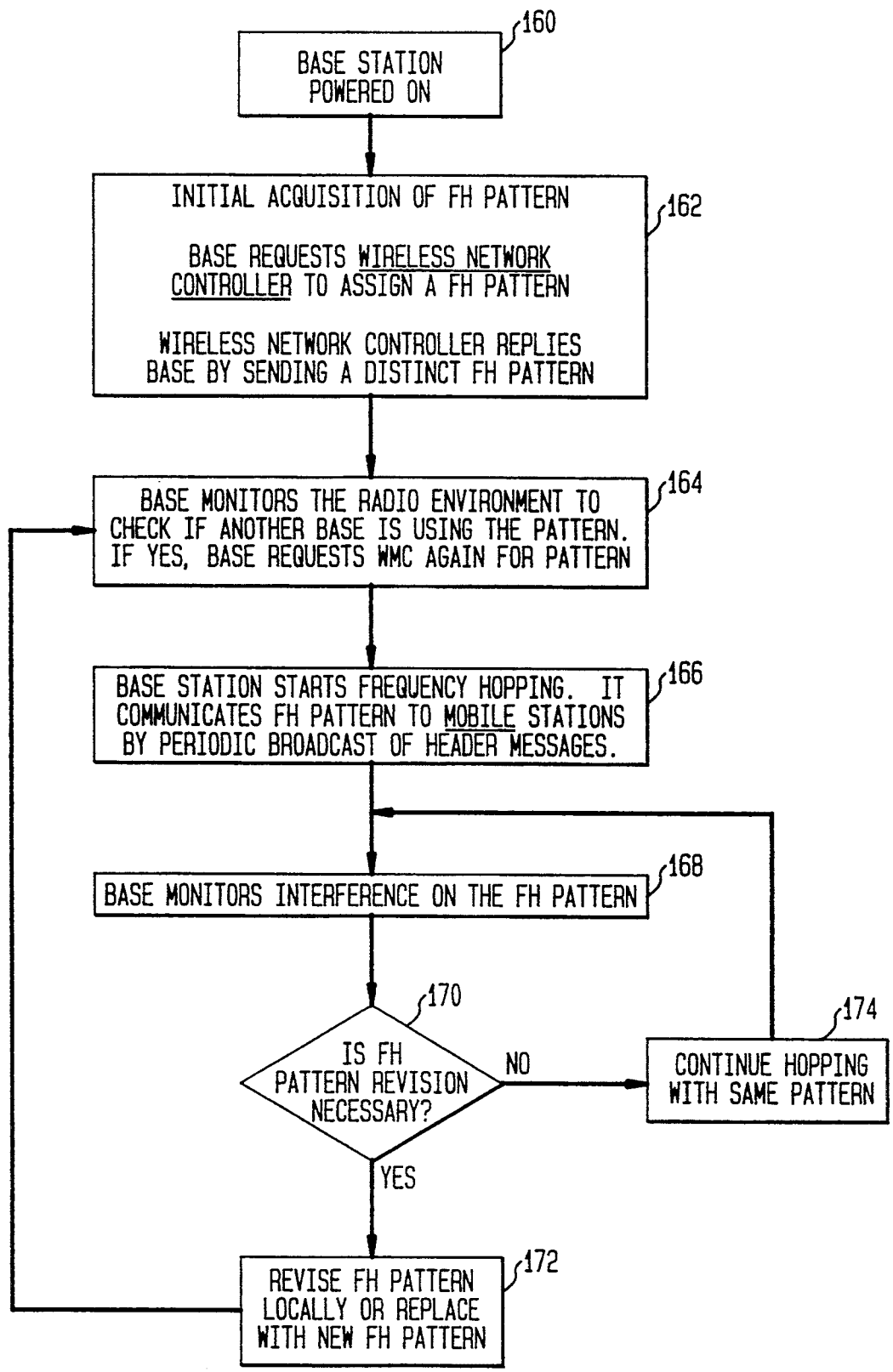
FIG. 6 is a flow chart of the frequency hopping operation of a single logical LAN.

FIG. 6 is a flow chart which provides an overview of Frequency Hopping operation in a single Logical LAN. When a base station is powered on at block 160 it must first acquire a FH pattern to use in the cell as shown at block 162. This is accomplished by sending a request and then receiving a FH pattern in response from the Wireless Network Manager. The base monitors its radio environment at block 164 to ensure that no other base within its radio vicinity is using the same FH pattern. Then it starts frequency hopping at block 166. It also communicates the FH pattern to mobile stations within its range. Mobile stations perform monitoring of interference on the hops in a FH pattern. The base station monitors interference on the FH pattern at block 168. At block 170, it is determined if FH pattern revision is necessary. If revision is necessary as determined at block 172, a return is made to block 164. If revision is not necessary, hopping is continued with the same pattern at block 174, and a return is made to block 168. Details of the various steps are described below.

First consider frequency-hopping pattern management "within" a single Logical LAN. The base stations in a Logical LAN operate in an "unsynchronized" manner. Each base station follows a cyclic frequency hopping pattern. One period of this cyclic hopping pattern structure is called a "superframe". Superframes of adjacent base stations satisfy the following conditions.

1. All the hops within a superframe have the same length.
2. All the base stations have the same number of hops within a superframe.

Superframes of adjacent base stations are not synchronized.

Figure 7:
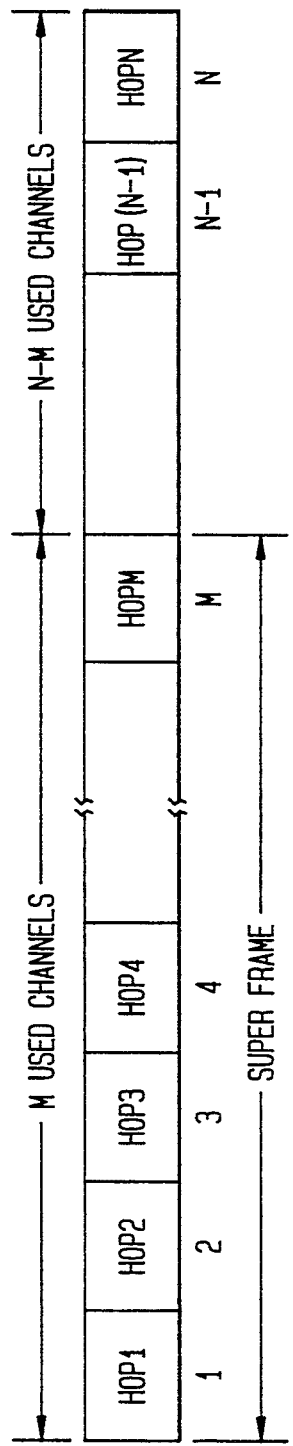
FIG. 7 is a general showing of the structure of a superframe comprised of M Hops in an N channel frequency band.

FIG. 7 illustrates a superframe comprised of M Hops. There are M, where M is an integer which is less than the integer N (M<N), used hops at any given time, and N-M unused hops. How a hopping pattern is acquired by a base station is explained shortly.

Figure 8:
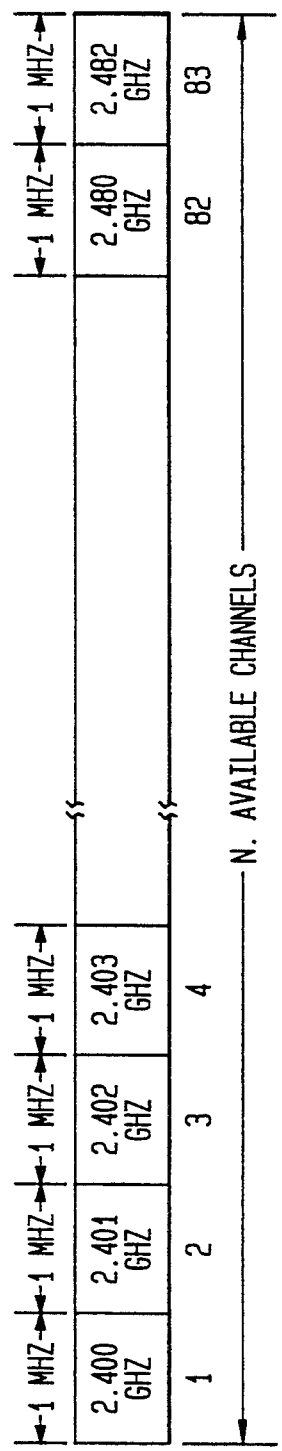
FIG. 8 is an example of a frequency band (83 MHZ wide) divided into 83 available channels each 1 MHZ wide for frequency hopping.

FIG. 8 illustrates an example of a frequency band (83 MHZ wide) divided into 83 available channels each 1 MHZ wide. A subset of the channels can be chosen to form a FH pattern. Each hop is one megahertz (1 MHZ) wide, and the frequencies entered from 2.400 gigahertz (GHZ) to 2.482 (GHZ). It is to be appreciated that a different frequency band may be utilized in the practice of the invention. In practice, different countries have different rules governing the frequency bands that may be utilized. As is known in the art, data is modulated on the carrier frequencies (hopping frequencies) for transmission between base stations and mobile stations;

1. FH Pattern Acquisition

Figure 9:
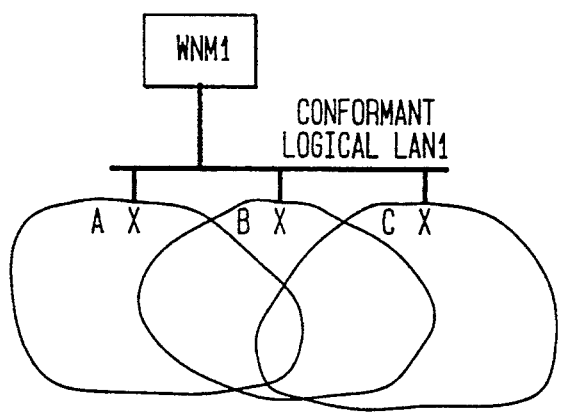
FIG. 9 is a block diagram of a single autonomous network with multiple cells.
Figure 10:
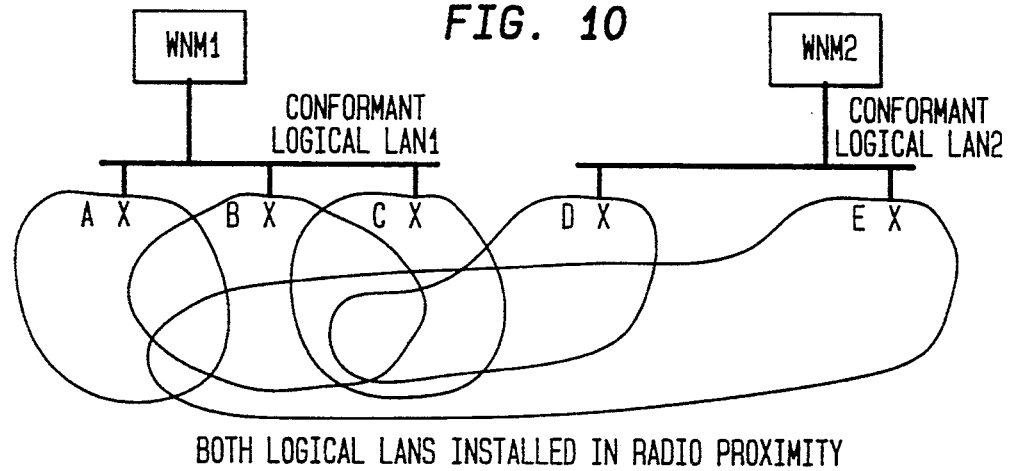
FIG. 10 is a block diagram of two collocated autonomous networks with overlapping cell coverage.
Figure 11:
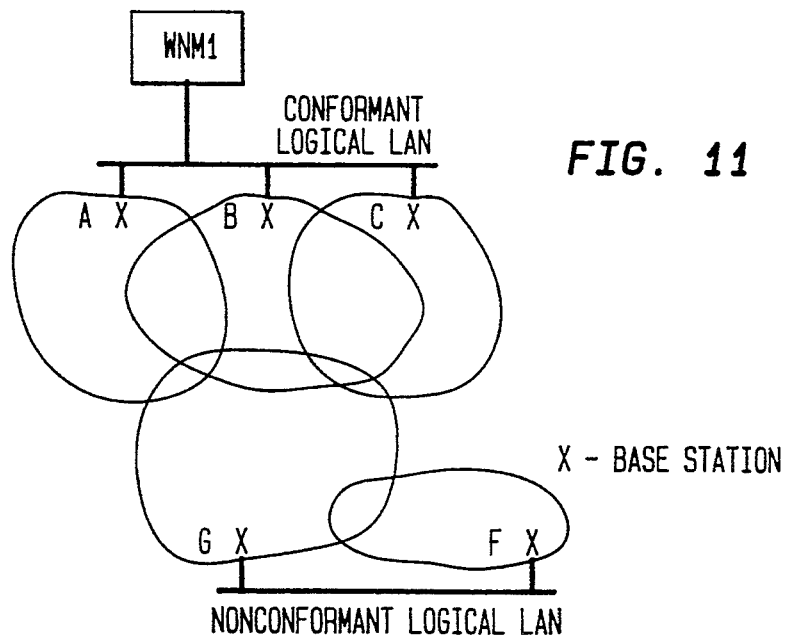
FIG. 11 is a block diagram of two collocated autonomous networks with partially overlapping cell coverage.

In a physical site, there may be several FH-based LAN installations that can potentially interfere with each other. A FH-based LAN that adheres to the method of FH pattern generation and assignment described in this invention is referred to as a "Conformant" Logical LAN. If a FH-based LAN does not adhere to the method of FH pattern generation and assignment described in this invention, it is referred to as a "Nonconformant" Logical LAN. Interference can be classified as follows:

1. Interference that occurs between multiple cells of a single Logical LAN. In FIG. 9, LAN1 is a Conformant Logical LAN with three base stations (A, B and C) that overlap with each other, and are controlled by a WNM1.
2. Interference that occurs between multiple cells across different Conformant Logical LAN installations. In FIG. 10, Cell E of LAN2 interferes with all three cells of LAN1 while Cell D of LAN2 interferes with Cells B and C of LAN1.
3. Interference that occurs between a Conformant Logical LAN installation and a Nonconformant FH-based LAN operating in the same frequency band. In FIG. 11, Cell G of a Nonconformant Logical LAN interferes with cells A, B and C of a Conformant Logical LAN1.

Pattern Acquisition in a Single Autonomous Network

The overall logic for Frequency-Hopping operation of a single Logical LAN was described relative to FIG. 6. An outline of the steps is as follows:

Initial Acquisition of FH Patterns by Base Station

Figure 12:
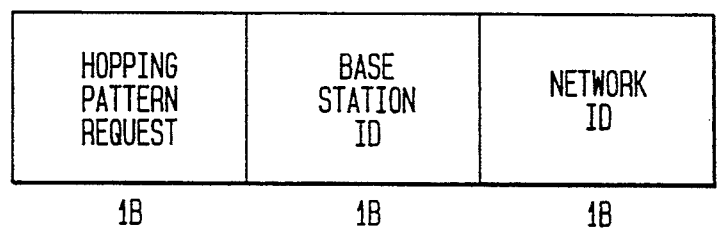
FIG. 12 is an illustration of a hopping pattern request packet from a base station to a wireless network manager.

Consider a Logical LAN with multiple base stations. When a Base Station BSi is powered on, it sends a Hopping Pattern Request (HPR) packet to the Wireless Network Manager. In FIG. 9, base stations A, B and C of LAN1 send HPR request packets (shown in FIG. 12) to their Wireless Network Manager WNM1.

Figure 13:
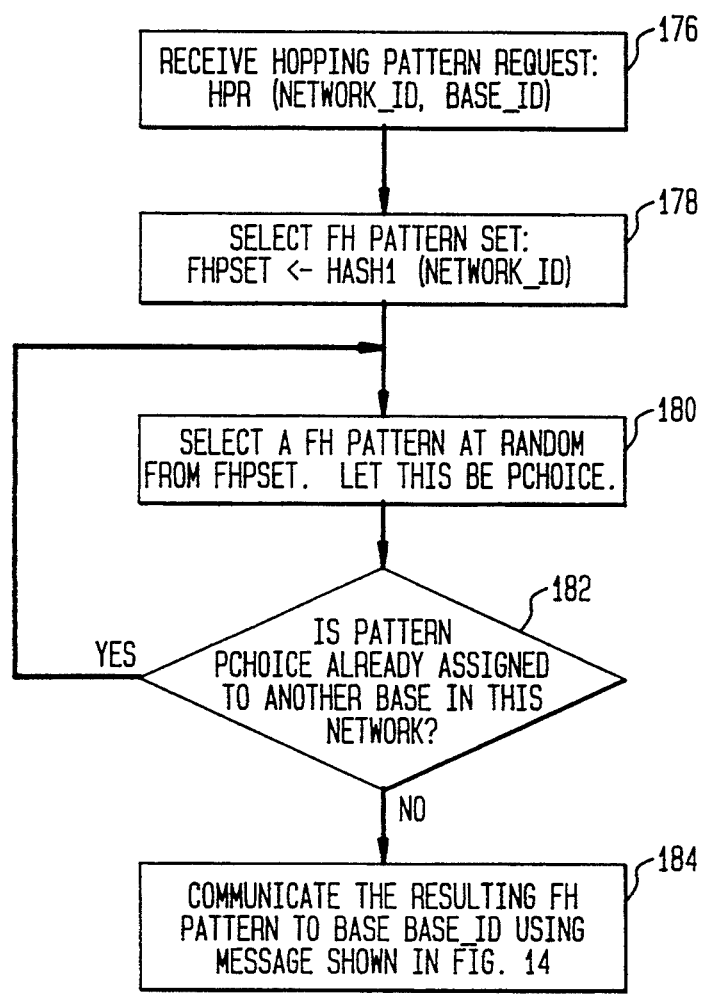
FIG. 13 is a flow chart illustrating the processing of a Hopping Pattern Request by a wireless network manager.

On receipt of Hopping Pattern Request packet at block 176, the Wireless Network Manager executes the following steps as shown in FIG. 13.

If multiple FH pattern sets are available, then use the Network_ID of a HPR packet and decide which set of FH patterns it should use as shown in block 178. This can be implemented by hashing on the Network_ID field. Let the chosen set be FHPSET. If there is only one FH pattern set, then it becomes FHPSET by default.

At block 180, randomly select a FH pattern from the set (FHPSET) of patterns. Suppose the selected pattern is PCHOICE. The Wireless Network Manager keeps track of FH patterns that have been assigned to base stations that have a common Network_ID. A determination is made at block 182 if pattern PCHOICE has already been assigned to another base in the network. If so, repeat the random selection of FH pattern by returning to block 180. Note that the purpose of randomizing pattern selection is to minimize the probability of choosing patterns already assigned to other base stations.

Figure 14:
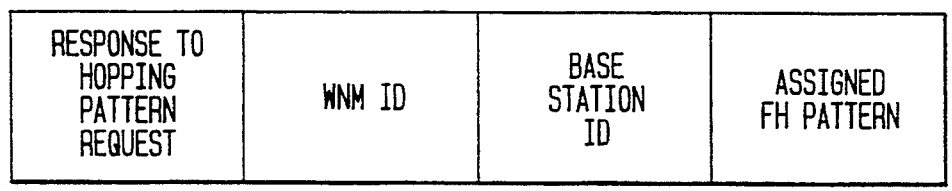
FIG. 14 is an illustration of a response to a Hopping Pattern Request from a wireless network manager to a base station.

If not, at block 184 communicate to the base station the resulting FH pattern. This communication occurs via the backbone communication network. The FH pattern information is contained in Response to a Hopping Pattern Request message as shown in FIG. 14. On receipt of the message, the base station immediately starts hopping with its newly assigned FH pattern.

Pattern Acquisition in Multiple Collocated Autonomous Networks

Within a single Logical LAN, the Wireless Network Manager minimizes interference by explicitly assigning distinct FH patterns to individual base stations. Multiple autonomous Logical LANs that are physically within radio range of each other are called Collocated Networks. Autonomous networks must work without any need for explicit coordination. This means that there can be no assumption or requirement that there be a single entity with global knowledge of all the collocated networks. The following method is used to achieve implicit coordination to minimize interference between collocated autonomous Logical LANs.

Figure 15:
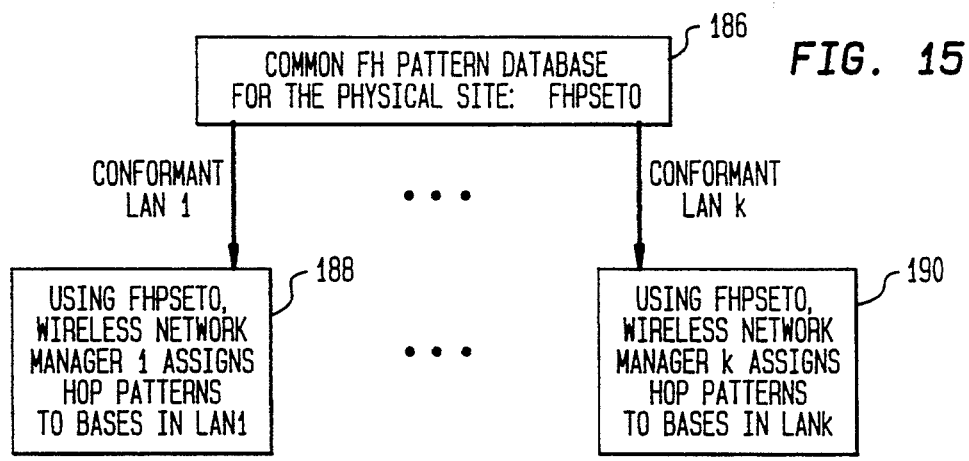
FIG. 15 is a flow chart of a hopping pattern acquisition in an autonomous collocated network.

Suppose a Customer wishes to install multiple conformant Logical LANs on, say, the first floor (LAN1 for Shoe Dept., LAN2 for Clothing Dept., LAN3 for Cosmetics Dept. etc.). These networks are collocated and can potentially interfere with each other. The installation of such collocated networks can be accomplished in such a way that they use the same distinct set of patterns as shown in FIG. 15. For such a customer who installs conformant collocated Logical LANs, the Wireless Network Managers are programmed to choose patterns from the same set, say FHPSET0, independent of each other as shown in block 186. In the above retail example, the 3 Logical LANs use the fact they are all physically located on the same Floor and choose to use the same distinct set of FH patterns). Each Wireless Network Manager assigns distinct FH patterns to base stations that it controls. At block 188, WNM1 assigns hop patterns to bases in LAN1, and at block 190, WNMK assigns hop patterns to bases in LANK. However, two Wireless Network Managers cannot guarantee that the subsets of patterns they choose from FHPSET0 are disjoint from each other. There is a nonzero probability that two Wireless Network Managers may choose one or more common patterns. Unacceptable interference occurs if the base stations belonging to collocated networks also hop exactly in phase with each other, an event with small but nonzero probability. This can be overcome by using techniques for interference monitoring and hop modifications described below.

FH Operation with Multiple Autonomous Networks

Interference suffered by a conformant Logical LAN due to the presence of collocated nonconformant LANs (for example, in a shopping mall, the Shoe Store may install a Conformant LAN but its neighbor a Toy Store may have a Nonconformant FH-based LAN) are similar in effect to interference suffered with randomly selected FH patterns. The interference level is comparable in the mean value but shows a greater standard deviation than in the assignment of orthogonal patterns. The effect of interference can be minimized by using pattern revision techniques described below.

2. FH Pattern Monitoring before Hopping

Figure 16:
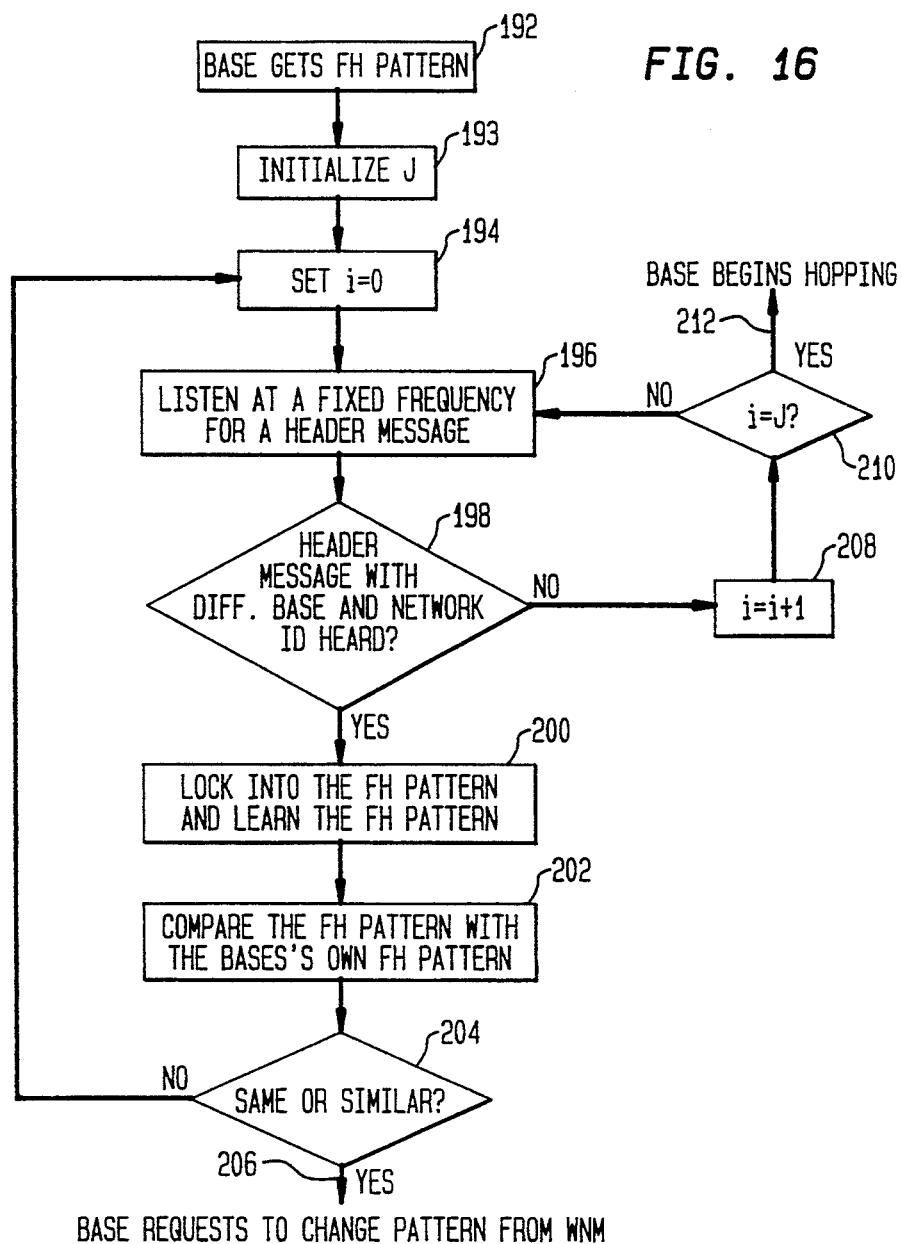
FIG. 16 is a flow chart of frequency hopping pattern monitoring prior to hopping.

With reference to FIG. 16, a method is followed by a base station to monitor other base stations which belong to other conformant logic LAN's to avoid using the same frequency hopping pattern before it begins hopping. After a base station obtains a frequency hopping pattern from its WNM at block 192, the base station listens to a total of j distinct frequencies in order to find if there are neighboring base stations using the same FH pattern. In block 193, j is initialized to a typical value of 4. A variable counter i is set to zero in block 194. The variable counter i counts to a maximum count of j. At block 196, the base station begins to monitor the frequency hopping patterns of surrounding base stations, which are possibly under the control of another WNM or other WNM's. In the beginning, the base station does not know who are the surrounding base stations and the frequency hopping patterns they have. However, the base station knows both the hop duration and the superframe length. The base station depends on executing the steps shown in FIG. 16 in learning the frequency hopping patterns.

An assumption is made that in the beginning of each frequency hop, a base station broadcasts a header which consists of the following information:

NETWORK ID BASE ID F(1) F(2) *** F(N)

where "NETWORK ID" is the identification of the network, "BASE ID" is the identification for the base station, F(1) through F(N) are the next N hopping frequencies. The F(1) through F(N) information allows the frequency hopping patterns of different base stations to be learned by other base stations through continuous monitoring. The number N is a system parameter. An N as large as 4 is found to be appropriate. Assuming that header error rate is 1 percent, the probability of losing all 4 headers consecutively is $10^{-8}$.

FIG. 16 shows that at block 196, a given base station listens at a fixed frequency and searches for valid header messages from neighboring base stations. At block 198, after the given base station hears a header transmission from another base station in another network, it tries to track and lock into the frequency hopping pattern of that base station at block 200 by listening to its header transmissions within a superframe time period. The given base station then compares the learned pattern with its own pattern at block 202. If they are the same or have large cross correlation, the given base station requests a new FH pattern from its WNM at block 206. If the two patterns are different, a return is made to block 194 and the given base station monitors another fixed frequency until another header with a different Base ID from another network is heard. At this point, the given base station tracks this FH pattern and compares the differences. This process is iterated at block 208 until no more headers with different Base ID from another network are found in J (say J=4) consecutive superframes at block 210. If no potentially interfering FH patterns are found, the given base station starts its own hopping and transmissions at line 212.

3. FH Pattern Revision

The main idea is to perform random monitoring and feedback and revise FH patterns to mitigate interference. The base station monitors the observed interference in each hop of its pattern on a continuous basis. Interference at a base station can be caused from neighboring base stations (belonging to the same or different Logical LANs) or some narrowband interference sources. Techniques that are used for identifying the interference between adjacent base stations and taking corrective action are described below.

Hop Insert/Delete

The method that is followed by a base station to control its frequency hopping pattern is now set forth. This is best seen by referring to FIGS. 7 and 8. Criteria that is used to perform dynamic insertion/deletion of frequency hops are described. In order to meet the requirement of FCC rule part 15.247 in the ISM band, a hopping pattern with a length M out of a total of N available frequencies is used. Assuming different bases use different patterns of length M, there are (N-M) unused frequencies. These frequencies are used for dynamic hopping pattern insertion/deletion purposes.

Dynamic hopping pattern insertion/deletion is used to combat narrowband interference that is continuous in nature. The basic ideas of dynamic hopping pattern insertion/deletion are:

a) Delete frequencies which are found to have interference.

b) Insert frequencies which are believed to be good.

In order to keep track of the performance of each frequency channel, a base maintains the following table in its WCA. The ACT table may form part of the data storage memory 68, which is shown in FIG. 2.

The table is an "Active Channel Table" (ACT). This table may form part of the memory of the WNM as shown at the network station 108 of FIG. 15, and has the following form:

| | Active Channel Table (ACT) | | | |
|---|---|---|---|---|
| Frequency | State(1) | *** | State(K) | Delete |
| FA(1) | good | | good | no |
| FA(2) | bad | | bad | yes |
| * | * | | * | * |
| FA(M) | good | | bad | no |

FA(1) through FA(M) are the M frequencies used in a superframe. The table keeps track of the states (either good or bad) of each frequency hopping channel up to last K superframes. According to the channel monitoring results of ACT, a base requests frequency hop deletions from its WNM. A frequency hop is defined as "bad" in a superframe if the following condition is met:

$$\frac{\text{retry count}}{\text{message count}} \geq X \%$$

A frequency hop is requested to be deleted if it is bad in more than Y times among the last K super frames. X, Y, and K are all system design parameters.

A WNM receives frequency hop deletion requests from various bases and makes frequency hop deletion/insertion decisions accordingly. In order to meet this goal, a WNM maintains an "Inactive Channel Table" (ICT). This table has the following form:

| | Inactive Channel Table (ICT) | | | |
|---|---|---|---|---|
| Frequency | Time of Last Use | Last Frequency Replaced | Bases Involved | Bases Unsatisfied |
| FI(1) | TOLU(1) | LFR(1) | {BI(1)} | {BU(1)} |
| FI(2) | TOLU(2) | LFR(2) | {BI(2)} | {BU(2)} |
| * | * | * | * | * |
| FI(N-M) | TOLU(N-M) | LFR(N-M) | {BI(N-M)} | {BU(N-M)} |

FI(1) through FI(N-M) are the N-M inactive frequencies. In the beginning, they are also the N-M unused frequencies (not in the set of the generated M frequencies). Time of Last Use (TOLU) records the time of last use of the frequency and Last Frequency Replaced (LFR) records the frequency which is replaced last time. Bases Involved (BI) is the set of bases involved in the frequency replacement. Bases Unsatisfied (BU) is explained below.

Once a frequency is requested to be deleted from the ACT table at a mobile station, a new frequency has to be found by the WNM from the ICT table to replace it. The new frequency is chosen according to the following general guidelines:

If the bad frequency is a particular FI(j) and the requesting base is not in the corresponding {BI (j)}, WNM replaces the bad frequency with LFR (j) and adds the requesting base index to {BI (j)}.

Those frequencies from the unused set in FI(,) have priority to be chosen for replacement. The new frequency should be separated from the bad frequency as much as possible. In order to make sure that large frequency separation can be made, (N-M) unused frequencies are evenly distributed within the selected ISM band.

If the bad frequency itself is from the unused set, WNM inserts the requesting base index into the corresponding {BU(*)} set in ICT. As the set {BU(*)} approaches the set {BI(*)} in the same row, WNM knows that the frequency replacement is not as effective as it expected. WNM should make a second frequency replacement if there are other unused frequencies available and delete the bad frequency from service.

If none of the N-M FI(*)'s are from the unused set, WNM incorporates the bad frequency information into a "Frequency Replacement Waiting List" (FRWL) of the following form:

| Frequency Replacement Waiting List (FRWL) | |
|---|---|
| Bad Frequency | Requesting Bases |
| BF(1) | {RB(I)} |
| * | * |

When the size of {RB(k)} associated with a bad frequency, BF(k), in FRWL, becomes large and exceeds the size of a particular {BI (j) } in ICT, WNM executes the following algorithm:

Replace LFR (j) for all the bases in {BI (j) } with FI (j), i.e., reverse the previous replacement.
Replace FI (j) with BF (k) in ICT.
Replace {BI(j)} with {RB(k)} in ICT.
Update TOLU (j) in ICT.
Remove the row of BF(k) in the FRWL.

The ideal here is that the N-M unused frequencies should be used to replace the interference frequencies which affect more bases. If there are several sets of {BI(*)} with the same size to choose from, TOLU(*) is used as a second criterion in choosing the replacement frequency. For example, in the following situation, frequencies from 1 to 5 are used to construct two FH patterns, frequencies 6 and 7 belongs to the unused set:

Frequency Replacement History

Pattern I (Base I)

```
                                 ICT
             FI(*)   TLOU(*)
LFR(*)
 1  2  3  4  5
────────────────
|     6              3
 6
|  7
v    3     6         2
 7
time
```

Pattern II (Base II)

```
 1  5  4  3  2
────────────────
|     6
|              7
v    6     3
time
```

Suppose in the beginning frequency 3 of both patterns is found under interference, it is replaced by 6. Then frequency 2 of both patterns is interfered and replace by 7. ICT is now as shown on the right side. Suppose now frequency 5 is affected by interference in these two patterns and another pattern, it is replaced by frequency 6 in all the three patterns, and frequency 6 is replaced by its old value, 3, in these two patterns.

Figure 17:
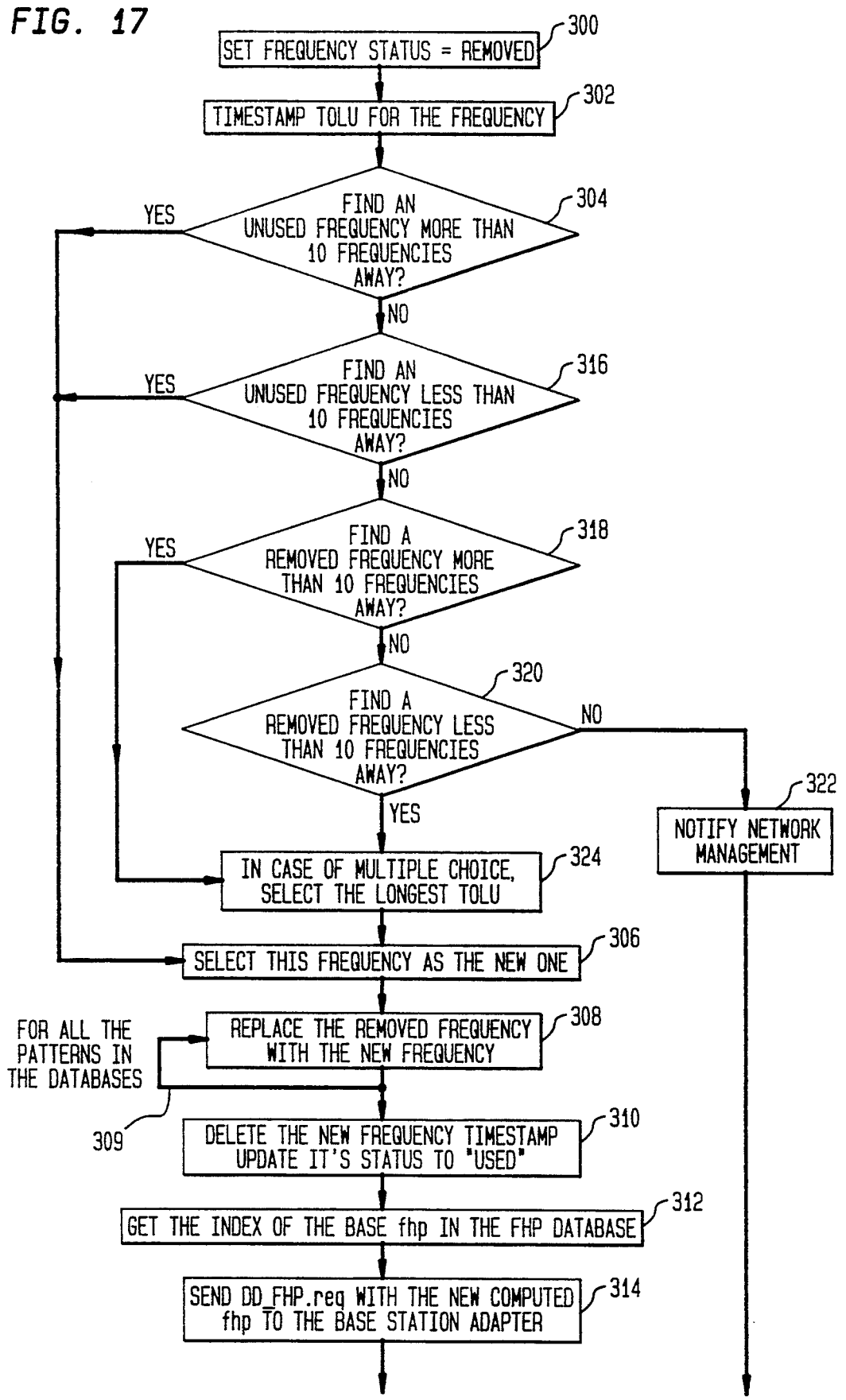
FIG. 17 is a flow chart of how the inactive channel table in the network control manager is updated.

Refer now to FIG. 17 which is a detailed flow chart of how, once a frequency is to be deleted from the ACT table at a mobile station, a new frequency is found by the WNM from the ICT table to replace it. At block 300, the WNC responds to a request to remove a bad frequency from the FHP and adding it to the ICT table, and setting its frequency status to "removed". The removed frequency is time stamped with its TOLU at block 302. The ICT is then searched at block 304 to find an unused hopping frequency that is more than 10 hopping frequencies away from the deleted hopping frequency. That is, if the deleted frequency is HOP22 (FIG. 7), then the search is for an unused hopping frequency at HOP32 or above. If such an unused hop frequency is found, this hop frequency is selected at block 306 as the new hopping frequency, and it replaces the removed frequency at block 308. The removed frequency is likewise removed in the database for all other FHPs in the database as indicated at line 309. The TO<U time stamp is removed from the new hopping frequency and its status is updated to "used" at block 310. The FHP database is then searched at block 312 to get the base FHP. The FHP request with the new computed FHP is then sent to the base station adapter as indicated at block 314.

If at block 304 an unused hopping frequency at more than 10 frequencies away cannot be found; at block 316, it is determined if an unused frequency less than 10 frequencies away can be found. If one is found, proceed to block 306 to continue as just explained. If one cannot be found at block 316, at block 318 it is determined if a removed frequency more than 10 hopping frequencies away can be found. If one is found, proceed to block 324, where if there is more than one such hopping frequency available, the one with the longest TO<U is selected. Proceed then to block 306 to continue as just explained. If one cannot be found at block 318, at block 320 it is determined if a removed frequency less than 10 frequencies away can be found. If one is found, proceed to block 324 and continue as previously explained. If no such frequency can be found, network management is notified of the failure at block 322.

Pattern Replacement

In an environment with multiple autonomous networks there is nonzero probability that two bases belonged to two different logical LANs will use exactly the same FH pattern. When these two bases use the same FH pattern and hop in phase with each other, a catastrophic interference situation may occur if the two bases are close enough in radio distance. In this situation, almost all the frequency channels in the active channel table (ACT) are subject to deletion. Whenever this happens, the base detects the situation, request a new FH pattern from its WNM, and start using the new FH pattern immediately when it is acquired.

Hop Advance

When bases belonging to different logic LAN's use FH patterns chosen from different sets of FH patterns, a situation might occur that at some particular phases of a FH patterns the FH radio system incurs much more serious interference than at the other phases. If the relative frequency accuracy of the crystal oscillators used at different bases is within $10^{-5}$, then it takes 1000 superframes for a base to drift out of phase once serious interference occurs (assuming 100 frequency hops per superframe). One way out of this interference situation is to advance a hop in the FH pattern once severe interference is detected by a base. This adaptive hop advance capability is essential in increasing the efficiency of autonomous systems using randomly generated patterns.

Figure 18:
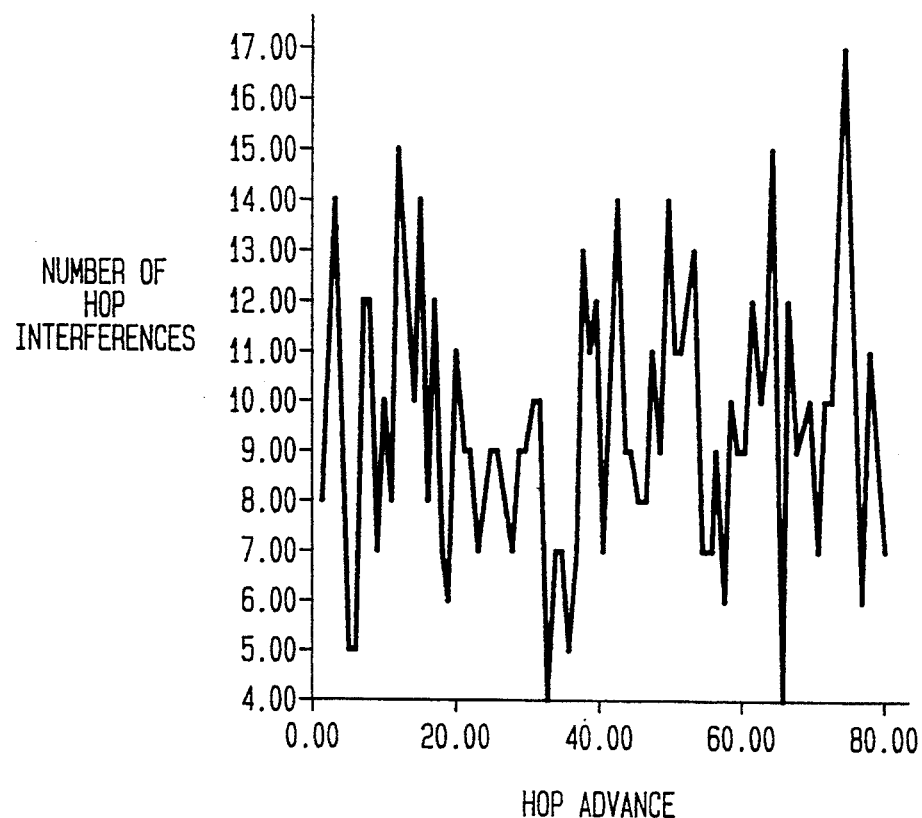
FIG. 18 is a diagram showing the total number of frequency overlaps as hop counts are advanced by a number from 0 to 79.
Figure 19:
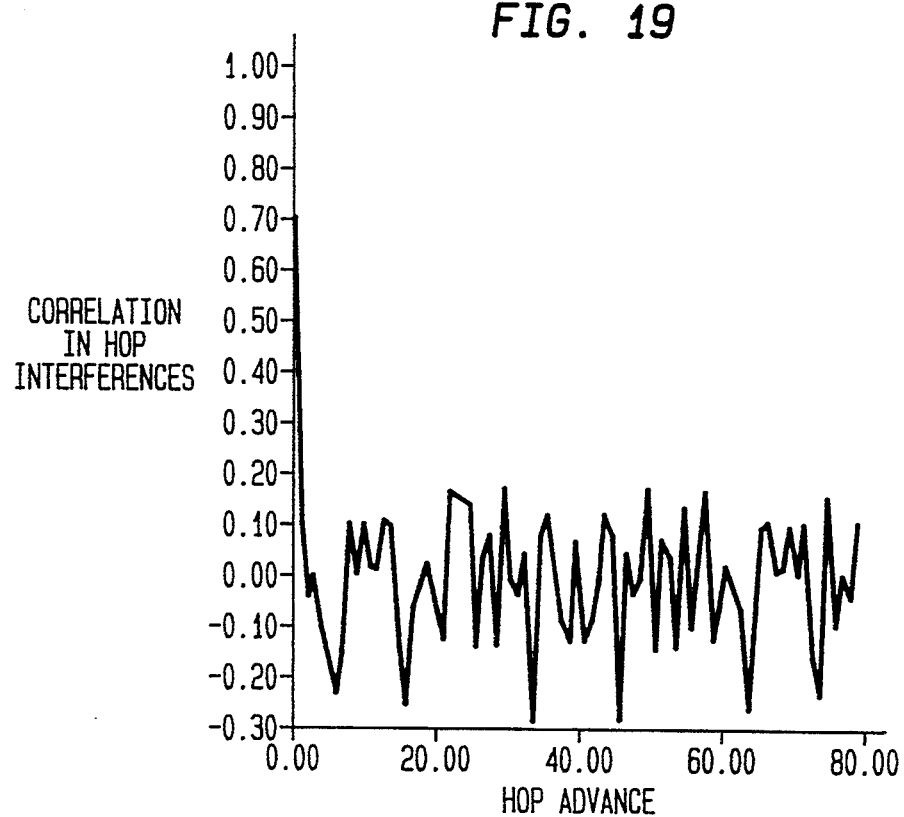
FIG. 19 is a diagram showing a corresponding autocorrelation function for the diagram of FIG. 15.

If there are 80 hopping frequencies within a superframe and 10 patterns interfering to a single pattern. FIG. 18 shows the total number of frequency overlaps as hop counts are advanced by a number from 0 to 79. FIG. 19 shows the corresponding autocorrelation function. An observation of FIG. 19 shows that the correlation in the number of frequency overlaps decreases to nearly 0 when the hop count is advanced by 1. This indicates in practice that a hop count doesn't need to be advanced by a amount larger than 1.

Overall Interference Control Strategy

Figure 20:
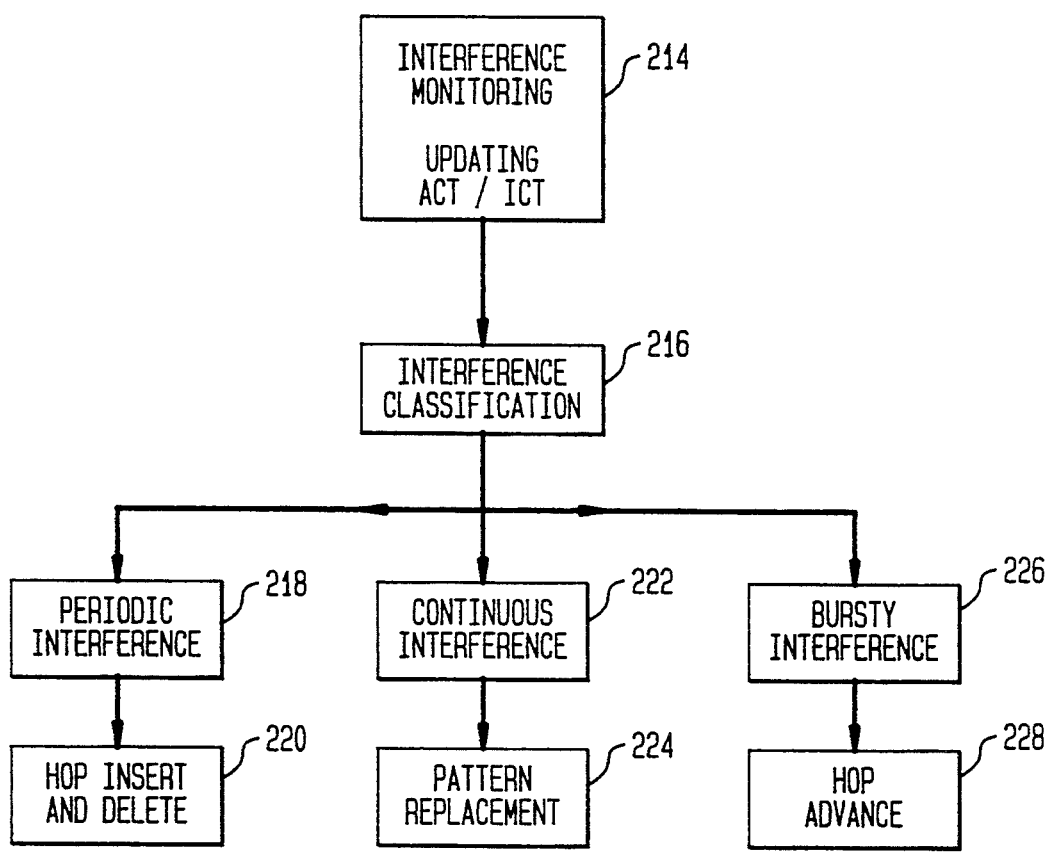
FIG. 20 is a block diagram of an overall interference control strategy.

The block diagram of FIG. 20 shows the overall interference control strategy:

The first step to achieve interference control at block 214 is to monitor the interference environment. This is done by updating the two tables described before, i.e., ACT and ICT. Based on observation of the behavior of ACT, interference is classified at block 216 into the following three categories:

1. Periodic interference: this kind of interference as shown at block 218, occurs when some narrowband interference sources exist and interfere with certain frequency hopping channels periodically every superframe.

A base detects this type of interference when the deletion condition set forth in the paragraph following the description of ACT is met. For example, if X is set to 50, Y to 4, and K to 7, i.e., a retry ratio larger than 50 percent for more than 4 out of last 7 superframes.

At block 220, a hop insert/delete mechanism as described above is used to counteract this type of interference.

2. Continuous interference: this type of interference as shown at block 222, occurs when a neighboring base accidentally uses the .same frequency hopping pattern and has the same phase as the current base. As a result, every frequency hop encounters some interference.

A base can detect this type of interference when it determines that all of a sudden more than J frequencies are declared bad. For example, J=15, that is, when more than one fifth of all the hopping frequencies are under interference.

At block 224, this type of event is dealt with at a base by requesting to replace the entire frequency hopping pattern from its WNM.

3. Bursty interference: this kind of interference as shown at block 226, happens when certain phases of a frequency hopping pattern incur more interference within a superframe than other phases. These situations arise most often when the frequency hopping patterns used by different bases are generated by random number generators instead of deterministic algebraic methods. Other situations arise when collocated networks interfere with each other.

A base constantly monitors the long term average in the number of "bad" frequencies in ACT. The average can be accomplished by a first degree IIR filter with a time constant of 10 minutes, for example. If all of a sudden, the number of bad hopping frequencies exceeds the long term average number by a certain threshold, the base tries to advance one hop in its FH pattern and examine whether the bad frequencies have been changed. If "yes", it means the bad frequencies are caused by bursty interference and can be dynamically mitigated by the hop advance technique as shown at block 228.

Industrial Applicability

It is an object of the invention to provide improved frequency hopping pattern assignment and control in radio networks.

It is another object of the invention to provide an improved frequency hopping pattern assignment and control in a single cell or a multiple cell autonomous collocated radio network.

It is still another object of the invention to provide a Wireless Network Manager (WNM) and a Wireless Control Agent (WCA) for controlling distribution and maintenance of hopping patterns in a single cell or multiple cell radio network.

It is yet another object of the invention to provide a single cell radio network where the WNM and the WCA are included in a single station, and to further provide a multiple cell radio network where the WNM is in a specific station on a LAN, and a WCA is located in each base station on the LAN, with the WNM functioning as a centralized managing station, and each WCA acting as a cell controller.

Having thus described our invention, what we claim as new and desire to secure by Letters Patent is:

1. A method of dynamically managing frequency hopping in a wireless communication network comprising a controller, a plurality of base stations, a local area network interconnecting said base stations with said controller, and a plurality of mobile stations, each said mobile station and base station including a transceiver for wireless bidirectional communication therebetween when in sufficient proximity to each other, said method comprising the steps of:

(a) requesting by a given base station a frequency hopping pattern assignment from said controller;
   (b) monitoring by said given base station the frequency hopping pattern of the other ones of said plurality of base stations;
   (c) requesting by said given base station a new frequency hopping pattern if another one of said plurality of base stations is using the same frequency hopping pattern as said given base station;
   (d) beginning frequency hopping by said given base station;
   (e) monitoring by said given base station interference relative to the assigned frequency hopping pattern;
   (f) determining by said given base station if frequency hopping pattern revision is necessary as the result of the monitoring of interferences; and
   (g) returning to step (b) if revision is necessary, and if revision is not necessary, continuing to hop with the same frequency hopping pattern.

2. The method of claim 1, wherein step (a) includes said controller performing the steps of:
   (a) selecting a frequency hopping pattern from a predetermined set of frequency hopping patterns;
   (b) determining if the selected frequency hopping pattern has been previously assigned to another one of said plurality of base stations;
   (c) returning to step (a) if the selected frequency hopping pattern has previously been assigned; and
   (d) communicating the selected frequency hopping pattern to said given base station.

3. The method of claim 1, wherein step (b) includes the steps of:
   (a) locking into the frequency hopping pattern of another base station to learn its frequency hopping pattern;
   (b) comparing the frequency hopping patterns; and
   (c) requesting a new frequency hopping pattern by said given base station if the frequency hopping patterns compare with predetermined limits.

4. The method of claim 1, wherein step (e) includes the steps of:
   (a) classifying interference into predetermined groups; and
   (b) controlling the interference based on which group it falls into.

5. The method of claim 4, wherein the predetermined groups of interference include periodic interference, continuous interference and bursty interference.

6. The method of claim 5, including the steps of:
   (a) controlling periodic interference by a hop insert and delete technique;
   (b) controlling continuous interference by a pattern replacement technique; and
   (c) controlling bursty interference by a hop advance technique.

7. A method of dynamically managing interference in a wireless communication network comprising a controller, a plurality of base stations, a local area network interconnecting said base stations with said controller, and a plurality of mobile stations, each said mobile station and base station including a transceiver for wireless bidirectional communication therebetween when in sufficient proximity to each other, said method comprising the steps of:

(a) requesting by a given base station a frequency hopping pattern assignment from said controller;

(b) selecting by said controller a frequency hopping pattern from a predetermined set of frequency hopping patterns;

(c) determining by said controller if the selected frequency hopping pattern has been previously assigned to another one of said plurality of base stations;

(d) returning to step (b) by said controller if the selected frequency hopping pattern has previously been assigned;

(e) communicating the selected frequency hopping pattern to said given base station;

(f) locking, by said given base station, into the frequency hopping pattern of another base station to learn its frequency hopping pattern;

(g) comparing the frequency hopping patterns;

(h) requesting a new frequency hopping pattern by said given base station if the frequency hopping patterns compare within predetermined limits;

(i) beginning frequency hopping by said given base station;

(j) monitoring by said given base station interference relative to the assigned frequency hopping pattern;

(k) determining by said given base station if frequency hopping pattern revision is necessary as the result of the monitoring of interferences; and (l) returning to step (h) if revision is necessary, and if revision is not necessary, continuing to hop with the same frequency hopping pattern.

8. The method of claim 7, wherein step (j) includes the steps of:

(a) classifying interference into predetermined groups; and (b) controlling the interference based on which group it falls into.

9. The method of claim 8, wherein the predetermined groups of interference include periodic interference, continuous interference and bursty interference.

10. The method of claim 9, including the steps of:

(a) controlling periodic interference by a hop insert and delete technique;

(b) controlling continuous interference by a pattern replacement technique; and (c) controlling bursty interference by a hop advance technique.

11. A method of dynamically managing interference in a wireless communication network comprising a controller, a plurality of base stations, a local area network interconnecting said base stations with said controller, and a plurality of mobile stations, each said mobile station and base station including a transceiver for wireless bidirectional communication therebetween when in sufficient proximity to each other, said method comprising the steps of:

maintaining an Inactive Channel Table (ICT) in said controller for keeping track of the inactive hopping frequencies in said network, including the time of last use of a hopping frequency, the last time a hopping frequency was replaced and the base stations involved;

maintaining an Active Channel Table (ACT) in each of said base station for keeping track of whether a given hopping frequency has been relatively free of interference and therefore is considered to be good or whether the given hopping frequency has not been relatively free of interference and therefore is considered to be bad and if it has been deleted within a predetermined time;

determining if a given hopping frequency has not been relatively free of interference at a given base station, and if so updating ACT to reflect that the given hopping frequency is considered to be bad;

requesting a new hopping frequency from said controller in response to determining that the given hopping frequency is considered to be bad;

selecting said new hopping frequency from the ICT by said controller, and updating ICT to reflect the selection;

sending the new hopping frequency to each base station that was using the hopping frequency considered to be bad, and at each base station that was using the hopping frequency considered to be bad, using the new hopping frequency instead.

12. The method of claim 11, wherein the step of selecting said new hopping frequency includes the step of: finding another frequency in said ICT that is a predetermined number of frequencies away from said given hopping frequency.

13. The method of claim 12, wherein the step of finding another frequency includes the steps of:

determining if there is an unused frequency in said ICT that is more than said predetermined number of frequencies away from said given hopping frequency, and if there is, selecting it as said new hopping frequency, and if there is not;

determining if there is an unused frequency in said ICT that is less than said predetermined number of frequencies away from said given hopping frequency, and if there is, selecting it as said new hopping frequency.

14. Apparatus for dynamically managing frequency hopping in a wireless communication network comprising a controller, a plurality of base stations, a local area network interconnecting said base stations with said controller, and a plurality of mobile stations, each said mobile station and base station including a transceiver for wireless bidirectional communication therebetween when in sufficient proximity to each other, comprising:

(a) means for requesting by a given base station a frequency hopping pattern assignment from said controller;

(b) means for monitoring by said given base station the frequency hopping pattern of the other ones of said plurality of base stations;

(c) means for requesting by said given base station a new frequency hopping pattern if another one of said plurality of base stations is using the same frequency hopping pattern as said given base station;

(d) means for beginning frequency hopping by said given base station;

(e) means for monitoring by said given base station interference relative to the assigned frequency hopping pattern;

(f) means for determining by said given base station if frequency hopping pattern revision is necessary as the result of the monitoring of interferences; and (g) means for returning to (b) if revision is necessary, and if revision is not necessary, including means for continuing to hop with the same frequency hopping pattern.

15. The apparatus of claim 14, wherein said controller includes:

(a) means for selecting a frequency hopping pattern from a predetermined set of frequency hopping patterns;
(b) means for determining if the selected frequency hopping pattern has been previously assigned to another one of said plurality of base stations;
(c) means for returning to (a) if the selected frequency hopping pattern has previously been assigned; and
(d) communicating the selected frequency hopping pattern to said given base station.

16. The apparatus of claim 14, wherein said means for monitoring the frequency hopping pattern includes:
(a) means for locking into the frequency hopping pattern of another base station to learn its frequency hopping pattern;
(b) means for comparing the frequency hopping patterns; and
(c) means for requesting a new frequency hopping pattern by said given base station if the frequency hopping patterns compare with predetermined limits.

17. The apparatus of claim 14, wherein said means for monitoring interference includes:
(a) means for classifying interference into predetermined groups; and
(b) means for controlling the interference based on which group it falls into.

18. The apparatus of claim 17, wherein the predetermined groups of interference include periodic interference, continuous interference and bursty interference.

19. The apparatus of claim 18, wherein the means for monitoring interference includes:
(a) means for controlling periodic interference by a hop insert and delete technique;
(b) means for controlling continuous interference by a pattern replacement technique; and
(c) means for controlling bursty interference by a hop advance technique.

20. Apparatus for dynamically managing a wireless communication network comprising a controller, a plurality of base stations, a local area network interconnecting said base stations with said controller, and a plurality of mobile stations, each said mobile station and base station including a transceiver for wireless bidirectional communication therebetween when in sufficient proximity to each other comprising:
an Inactive Channel Table (ICT) in said controller for keeping track of the inactive hopping frequencies in said network, including the time of last use of a hopping frequency, the last time a hopping frequency was replaced and the base stations involved;
an Active Channel Table (ACT) in each of said base station for keeping track of whether a given hopping frequency has been relatively free of interference and therefore is considered to be good or whether the given hopping frequency has not been relatively free of interference and therefore is considered to be bad and if it has been deleted within a predetermined time;
means for determining if a given hopping frequency has not been relatively free of interference at a given base station, including means for updating ACT to reflect that the given hopping frequency is considered to be bad;
means for requesting a new hopping frequency from said controller in response to determining that the given hopping frequency is considered to be bad;
means for selecting said new hopping frequency from the ICT by said controller, including means for updating ICT to reflect the selection;
means for sending the new hopping frequency from said controller to each base station that was using the hopping frequency considered to be bad, and
means at each base station that was using the hopping frequency considered to be bad for using the new hopping frequency instead.

21. The apparatus of claim 20, wherein said means for selecting said new hopping frequency includes:
means for finding another frequency in said ICT that is a predetermined number of frequencies away from said given hopping frequency.

22. The apparatus of claim 21, wherein said means for finding another frequency includes:
means for determining if there is an unused frequency in said ICT that is more than said predetermined number of frequencies away from said given hopping frequency, and if there is, means for selecting it as said new hopping frequency, and if there is not;
means for determining if there is an unused frequency in said ICT that is less than said predetermined number of frequencies away from said given hopping frequency, and if there is, means for selecting it as said new hopping frequency.

* * * * *